(12) United States Patent
Drago

(10) Patent No.: US 8,845,230 B2
(45) Date of Patent: Sep. 30, 2014

(54) MOISTURE ACTIVATED PHANTOM IMAGING PROCESS AND PRODUCT

(71) Applicant: James Philip Drago, Boca Raton, FL (US)

(72) Inventor: James Philip Drago, Boca Raton, FL (US)

(*) Notice: Subject to any disclaimer, the term of this patent is extended or adjusted under 35 U.S.C. 154(b) by 0 days.

(21) Appl. No.: 13/959,650

(22) Filed: Aug. 5, 2013

(65) Prior Publication Data

US 2013/0316900 A1  Nov. 28, 2013

Related U.S. Application Data

(63) Continuation-in-part of application No. 13/168,984, filed on Jun. 26, 2011, now abandoned.

(51) Int. Cl.
| | |
|---|---|
| C04B 41/45 | (2006.01) |
| E01F 9/00 | (2006.01) |
| A43B 3/00 | (2006.01) |
| B41M 3/00 | (2006.01) |
| B32B 3/10 | (2006.01) |
| B41M 5/00 | (2006.01) |

(52) U.S. Cl.
CPC ............ *E01F 9/007* (2013.01); *C04B 41/4501* (2013.01); *A43B 3/0084* (2013.01); *B41M 3/00* (2013.01); *B32B 3/10* (2013.01); *B32B 2437/00* (2013.01); *B41M 5/0029* (2013.01)
USPC ................................. 404/9; 40/594

(58) Field of Classification Search
CPC ............ C04B 41/4503; C04B 41/4501; C04B 2103/0052; C04B 2111/00508; C04B 2111/00543; E01F 9/083; E04H 4/0075; E04H 4/14
USPC ............................................. 404/9
See application file for complete search history.

(56) References Cited

U.S. PATENT DOCUMENTS

| | | |
|---|---|---|
| 5,050,498 A | 9/1991 | Smith |
| 5,809,590 A | 9/1998 | Williams et al. |
| 6,576,074 B1 * | 6/2003 | Cabrera et al. ................... 156/71 |
| 6,703,108 B1 * | 3/2004 | Bacon et al. ................... 428/143 |
| 7,134,749 B2 | 11/2006 | Ben-Zur et al. |
| 7,954,921 B2 | 6/2011 | Ben-Zur et al. |
| 2003/0035917 A1 | 2/2003 | Hyman |
| 2005/0279236 A1 | 12/2005 | Jennings |
| 2006/0154180 A1 | 7/2006 | Kannurpatti |
| 2007/0103528 A1 | 5/2007 | Ben-Zur et al. |
| 2007/0104899 A1 | 5/2007 | Pearl et al. |
| 2008/0000121 A1 | 1/2008 | Star et al. |
| 2008/0010871 A1 | 1/2008 | Holmes et al. |
| 2008/0171155 A1 | 7/2008 | Haupt et al. |
| 2009/0075040 A1 * | 3/2009 | Gorman ........................ 428/203 |

\* cited by examiner

*Primary Examiner* — Kristina Junge
(74) *Attorney, Agent, or Firm* — Allen D. Hertz, P.A.; Allen D. Hertz

(57) ABSTRACT

Moisture-activated invisible stencil technology is created by applying a moisture-blocking agent in accordance with an artwork is applied to a base substrate. The base substrate is preferably fabricated of a moisture absorbing material. When the object is subjected to moisture, moisture wets to the exposed portion of the base substrate and is repelled in the areas where the moisture-blocking agent is applied thereon. The wetted portion of the base substrate changes in shade or color to expose the concealed image. The moisture-activated invisible stencil technology can be applied for simple aesthetic applications or advanced for applications to identify wet objects. The advanced applications can include warnings for wet roadways, pool decks, umbrellas, and the like.

20 Claims, 20 Drawing Sheets

MOISTURE ACTIVATED PHANTOM IMAGING PROCESS AND PRODUCT

CROSS REFERENCE TO RELATED APPLICATIONS

This Utility patent application is a Continuation-In-Part claiming the benefit of PCT Application Serial Number PCT/US2012/043912, filed on Jun. 24, 2012, which claims the benefit of co-pending U.S. Non-Provisional patent application Ser. No. 13/168,984, filed on Jun. 26, 2011, which are incorporated herein by reference in their entireties.

FIELD OF THE INVENTION

The present invention relates to a moisture-activated image. More specifically, the disclosure describes a process and related applications for applying an image onto an object, where the applied image remains concealed until the image is subjected to moisture.

BACKGROUND OF THE INVENTION

The present invention relates to a method and respective applications which apply a graphical image, a pattern, text, or any combination thereof onto an article, wherein the illustration appears, disappears, then re-appears through a multitude of cycles without compromising the durability of the article using a process defined as moisture-activated invisible stencil technology.

It is common to apply or create an image, graphic, pattern or text on and into a fabric or material to enhance its aesthetic appearance. For instance, often times typical t-shirts are altered by applying artwork in a form of an image, a graphic, a pattern, and/or text to the front or back of the fabric or material of the t-shirt to share artwork, convey a message, display a logo, or present any other information. Other articles such as apparel, including shirts, pants, sweatshirts, sweatpants, coats, shoes, canvas shoes, hats, socks, and the like can also be adorned by the moisture-activated invisible stencil technology. The technology can be expanded to other products, including backpacks, bedding including mattresses, bed sheets, cover sheets, mattress liners, and the like; table wear including tablecloths, napkins, and the like; pool decks; wet roadway warnings including road surface appliqués, road signs, and the like; absorbents, including sponges, towels, and the like; coolers; individual beverage coolers; umbrellas; and the like.

Artwork is commonly applied to the apparel or other material via an appliqué, silk screening, heat transfers, printing process, painting, embroidery, weaves, stone washing, tie dyes and/or other dyes, and the like. The artwork is generally of an opaque colored process, where the artwork remains visible throughout the life of the garment or other object. It is further noted that the artwork remains visible as applied to the material. More specifically, if the artwork were printed or applied to a single side of the material, it remains visible to and only to the first side of the material. If the artwork were applied to both sides of the material, such as embroidery, it remains visible to both sides of the material.

A first known related art utilizes nylon or other synthetic material that is treated to allow a variation in the shading of the fabric to appear as a pattern when the fabric is wet which is not visible when the fabric dries. The first known related art is limited wherein the nylon fabric does not allow the pattern to be visible on both sides of the fabric. The surface of the nylon fabric must be altered on the top of the fabric to allow the pattern to become visible on only the top of the fabric. The method is limited to nylon or very similar synthetic material, as process requires a branding or melting of the synthetic fabric surface of the nylon fabric to produce the effect. It is recognized that the synthetic nylon fabric dries very quickly, thus the image is only visible over a very short time period. Since the surface of the nylon fabric is altered, the image can become visible when the material is placed at an angle to the viewing party. The contrast created when the material is subject to moisture is limited at best, thus the artwork is only visible within a short viewing distance.

A second known related art utilizes a method forming of a distinct pattern on an article of apparel by applying a template onto a base substrate. A wax is applied over the stencil. The stencil is removed, leaving an exposed portion of the base substrate for application of a dye, paint, stain, or other color treatment. The exposed portion of the base substrate is colored. The wax is subsequently removed, leaving the applied image thereon.

A third known related art utilizes a method by which images on a disposable material fade when the material gets wet. The third known related art is limited where the visible image only fades when wet and fails to reappear when the material dries. The moisture causes degradation of the applied image, thus causing the image to fade away. This creates a single use application of the third known related art. The third known related art generally applies the images onto a disposable back-sheet which are typically made of a 'breathable' polyethylene film or a non-woven and film composite which is intended to prevent wetness transfer to the bed or clothes while helping the child to learn to stay dry. An example of this embodiment is a diaper, which includes an image. The image is dissolved by moisture to indicate that the image has been subjected to moisture. Since the image dissolves, it can't reappear when dry.

A fourth known related art utilizes a method of placing an opaque fabric over a secondary printed fabric such that when the opaque fabric subjected to moisture, the opaque fabric becomes partially transparent enabling the secondary printed fabric to show therethrough. The fourth known related art is limited in the requirement of two layers of material. The outer layer must be of a special type of opaque fabric, which would become partially transparent when wet. The opaque fabric must also remain in contact with the printed layer to ensure visibility of the artwork. Any gap therebetween would limit the viewing of the artwork of the second layer.

A fifth known related art is a toy that utilizes a frame which holds paper that has a highly colored substrate covered by a layer of silica and resins which becomes transparent when wet and opaque when dry so that the bright color does or does not show through depending on whether the surface is wet or dry. A fifth known related art is limited wherein the apparatus requires a layer of silica and resin across its entire surface. The concept severely limits any potential applications, as the material is not robust. Paper is not susceptible to applications for apparel, repeated use, heavy traffic such as floors, roadways, etc., and the like. The design is not capable of being cleaned.

A sixth known related art utilizes printed artwork using inks that remain concealed until exposed to an activator are currently available, wherein the activator is Ultra-Violet light. The image is commonly outlined with non-changing ink, such as a black outline, a colored image, and the like. The UV activated ink is generally colored and applied within the printed line drawing, where the UV activated inks become visible, revealing a color enhancement to the illustration. The ink required for this application is expensive. Applications using this ink are limited, as the process requires UV light to reveal the image.

Objects that are wet can create hazardous conditions. Wet roads generally have less traction than dry roads. Signs are commonly used to warn drives that roads may become slippery when wet. This process is limited, where the driver is not informed if the roads are actually wet. Wet pool decks can become slippery. Pool decks are subjected to a warning system similar to the process described for roads; relying upon signs. Floors, such as retail outlets, supermarkets, office buildings, and the like can become slippery when wet. When a floor becomes wet, the process commonly requires deployment of a warning marker, such as a cone or other warning device. A significant limitation is the time between when traction is reduced on a surface due to moisture and when a warning of the pending hazard is presented.

While the disclosed references may be suitable for the particular purpose to which they address, they fail to enable hidden or "phantom" artwork to appear when moisture is applied to the material and subsequently disappear when the material dries.

There is a need for a method of applying an illustration onto an object, where the illustration is revealed when subjected to moisture and disappears when the article dries. The desired process should be repeatable over a multitude of cycles without compromising the durability of the article. The illustration can be provided in the form of a graphical image, a pattern, text, or any combination thereof. The method should be repeatable, the process should not require costly equipment, and such method should not affect the use of the article and in which the article is unchanged by the process. It is desired to provide a method that can provide immediate notification of a hazardous surface.

SUMMARY OF THE INVENTION

The present disclosure is generally directed to an apparatus and respective method of enabling artwork to remain invisible until the artwork is subjected to moisture. When the artwork is subjected to moisture, the artwork becomes visible until the material dries, where the artwork then subsequently disappears.

In a generic embodiment, the apparatus and respective method for providing a moisture-activated image includes:
  a moisture absorbing material provided as a base carrier substrate;
  a colorless moisture-blocking agent applied onto the base carrier substrate, wherein the moisture-blocking agent is applied in a pattern resembling the desired artwork.

In another aspect, the moisture-blocking agent is applied by a printing process.

In another aspect, the base carrier substrate is provided in a form factor of an item of apparel, including a shirt, a T-shirt, pants, an undergarment, a cap, socks, a belt, a jacket, shoes, a sweater, a scarf, a bandana, and the like.

In yet another aspect, the blocking agent can be applied to the either a viewing side or a contacting side of the material.

In yet another aspect, the blocking agent can impregnate the material, wherein the blocking agent dries through the material.

In yet another aspect, the moisture-activated image is incorporated into a handkerchief.

In yet another aspect, the moisture-activated image is incorporated into a tablecloth, napkins, and the like.

In yet another aspect, the moisture-activated image is incorporated into a wet roadway notification, wherein the notification can be provided onto a roadway surface, a street sign, and the like.

In yet another aspect, the moisture-activated image is incorporated into a floor, including a flooring of a retail outlet, supermarket, office building, convenience store, commercial high traffic areas, warehouse, basement, and the like.

In yet another aspect, the moisture-activated image is incorporated into a pool deck, a boat deck, runway or airport gate surface, and the like.

In yet another aspect, the moisture-activated image is incorporated into a bed, a mattress, a sheet or sheets, a bed liner, and the like.

In yet another aspect, the moisture-activated image is incorporated into a sponge, a towel, and the like.

In yet another aspect, the moisture-activated image is incorporated into a cooler, an individual beverage cooler, and the like.

In yet another aspect, the moisture-activated image is applied presenting a positive image of the artwork, where the artwork becomes visible when the material is subjected to moisture.

In yet another aspect, the moisture-activated image can include a quantifiable means for determining a volume of moisture applied to the material. An exemplary embodiment includes a series of smaller, individual markings applied to a T-shirt, wherein the wearer would count the visible markings, which would correlate to a number of burnt calories.

In yet another aspect, the apparatus further comprises a moisture barrier liner provided on a contact side of the base carrier substrate.

In yet another aspect, the moisture-activated image is applied presenting a negative image of the artwork, where the background of the artwork changes to present the artwork when the material is subjected to moisture.

In yet another aspect, the moisture-activated image is provided as a film treatment adhered to a surface by an adhesive. The film treatment can be provided having a positive artwork or a negative artwork.

In yet another aspect, the moisture-activated image is provided as a film applied upon a surface, wherein the film and respective adhesive are transparent. The film is fabricated of a material, wherein when the region is dry, the film blends in to the base substrate, thus being virtually invisible and wherein when the region is wet, the base substrate absorbs moisture, changing color while the film repels the moisture retaining the dry color of the substrate, thus presenting a contrast in color and a resulting associated message.

In yet another aspect, the film treatment can be supported by a backing material prior to and during application of the film treatment onto the surface of the roadway.

In yet another aspect, a top, exposed surface of the film can be formed having a raised center or an arched shape to aid in directing moisture from the exposed surface of the film onto the exposed surface of the roadway.

In yet another aspect, the film can include recessions spatially arranged about an exposed top surface.

In yet another aspect, the recession can include a color changing composition to aid in providing a contrast between the exposed surface of the roadway and the film.

In yet another aspect, the recession can be formed in a shape causing a prismatic effect to moisture collected therein to aid in providing a contrast between the exposed surface of the roadway and the film.

In yet another aspect, the film can include recessions spatially arranged about an exposed top surface.

In yet another aspect, the film treatment can be fabricated of a material having a thermoforming temperature above a high normal operating temperature, but low enough to enable the film treatment to be heated to conform to the surface of the roadway.

In yet another aspect, the film treatment can be fabricated of a material having a thermoforming temperature above a high normal operating temperature, but low enough to enable the film treatment to be heated to adhere to the surface of the roadway.

In yet another aspect, the film treatment can be fabricated of a material having a thermoforming temperature above a high normal operating temperature, but low enough to enable the film treatment to be heated to become partially embedded within the surface of the roadway.

In yet another aspect, a composition can be applied to the surface of the roadway prior to the application of the blocking agent or film treatment, wherein the composition is moisture absorbent and changes tint or color when moisture is applied to the composition.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. For purposes of description herein, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
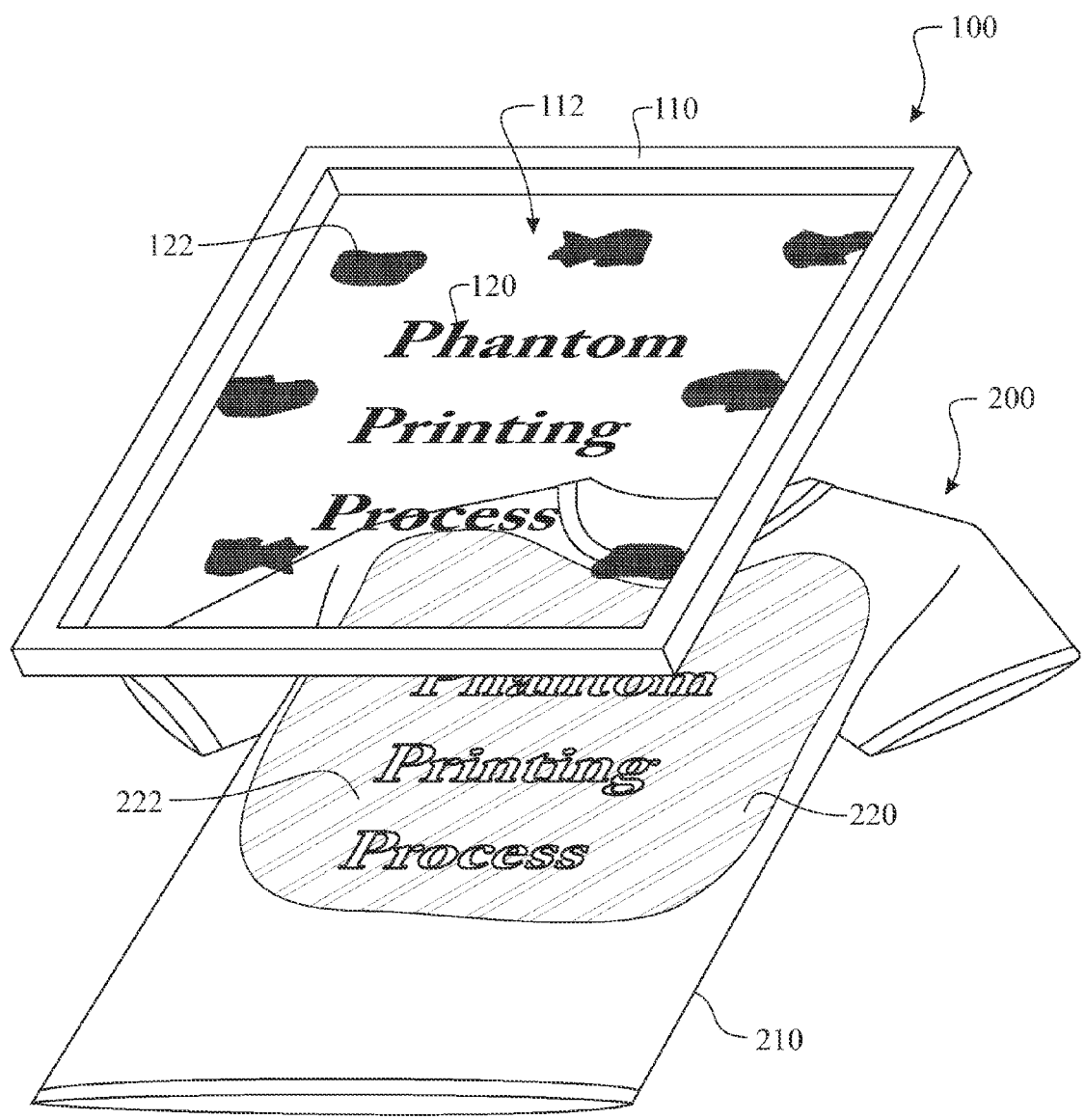
FIG. 1 presents an isometric view for applying a background blocking image onto an exemplary T-shirt to present a positive moisture-activated image.
Figure 2:
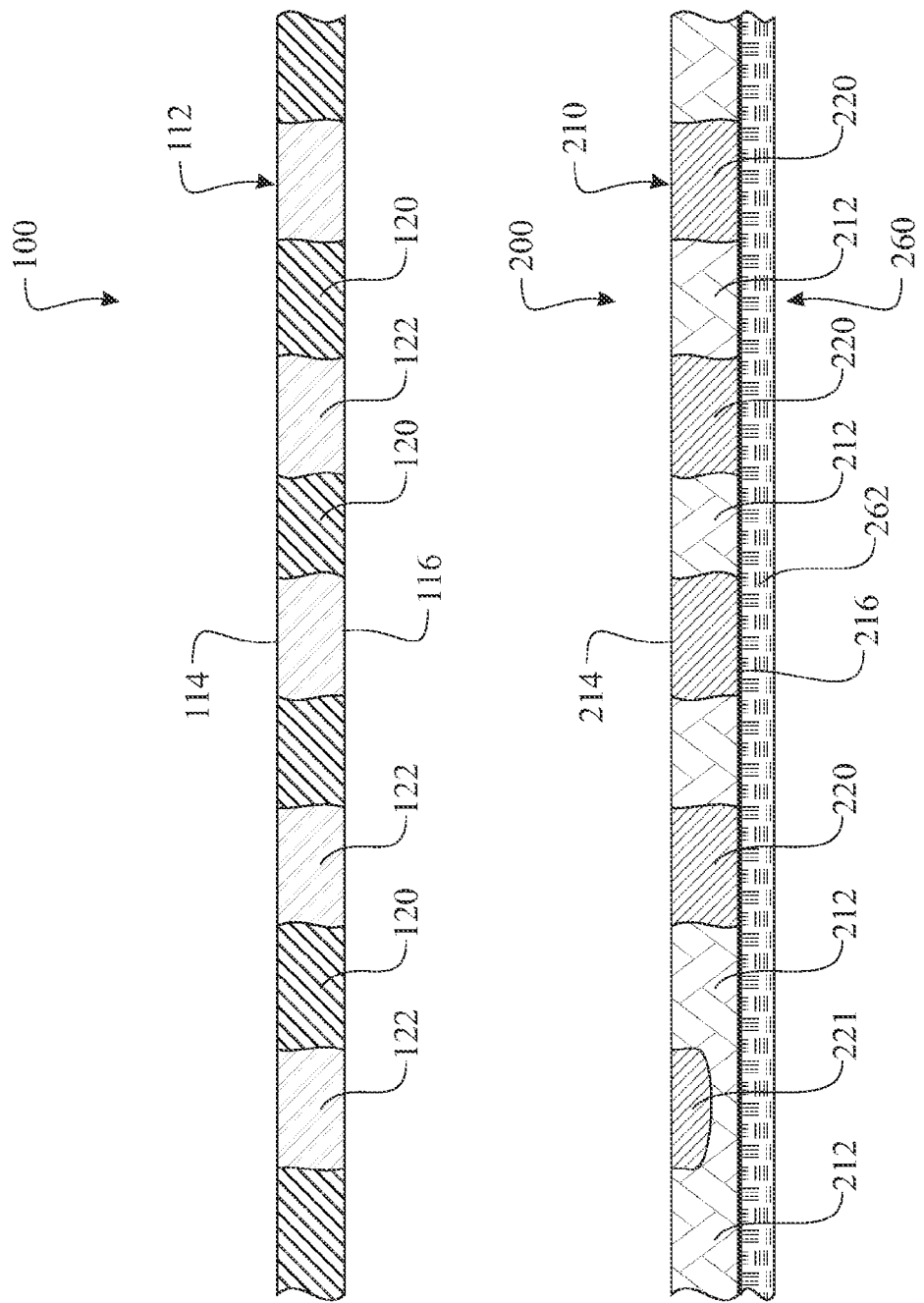
FIG. 2 presents a sectioned view of an exemplary screen printing apparatus for applying the blocking material onto the subject base carrier substrate.
Figure 3:
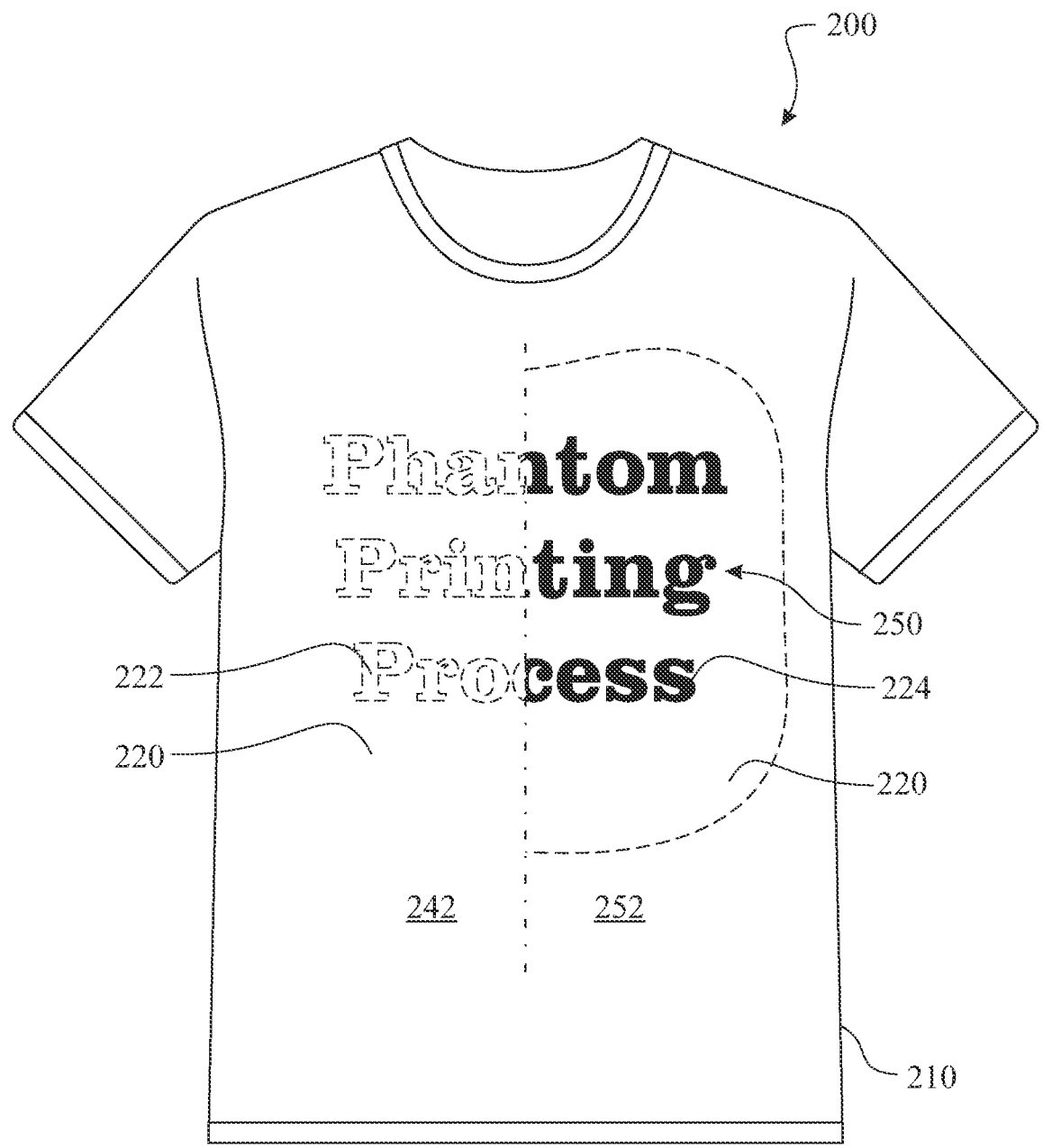
FIG. 3 presents a top plan view of the exemplary T-shirt of FIG. 1, illustrating a dry representation and a moisture applied representation of the positive artwork.

A moisture-activated image can be created by applying a moisture-blocking agent to any moisture absorbent material as illustrated in a first exemplary embodiment presented in FIGS. 1 through 3. The moisture-activated image is applied in a pattern representative of desired artwork. The artwork includes a graphical image, a pattern, text, or any combination thereof. The pattern is created by any means known by those skilled in the art. The exemplary embodiment utilizes a screen-printing process to apply the moisture-blocking agent onto the object; an apparel 200 in the exemplar embodiment. The applied moisture-blocking agent 220 prevents wetting of any moisture into the apparel material 210, whereas areas of the apparel material 210 having exposed material (void of the moisture-blocking agent) absorb the moisture and thus change shade or color to reveal the moisture activatable image 222. When the apparel material 210 dries, the moisture activatable image 222 returns to a concealed configuration. The appearance and disappearance of the moisture activatable image 222 is repeated throughout the life of the product.

The applied moisture-blocking agent 220 can be any type of moisture repelling or blocking chemical compound including, a four carbon fluorocarbon chain and a sulfonic acid functional group acting as an anion or ion with more electrons than protons, giving a net negative charge which functions as a stable fluorosurfactant because of the strength of carbon-fluorine bonds, a synthetic hydrophobic surface-applied compound, a fluoropolymer, and the like, and any combinations thereof.

The applied moisture-blocking agent 220 is applied by an exemplary printing process. It is understood that any application process can be used to create the moisture activatable image 222. The application process can be referred to as moisture-activated, invisible stencil technology. The printing process utilizes a screen printer 100, the screen printer 100 comprising a printing screen 112 held in tension by a screen printing frame 110. A blocked screen image 120 is applied to a portion of the printing screen 112, wherein the blocked screen image 120 blocks transfer of the applied moisture-blocking agent 220 to the apparel material 210. The blocked screen image 120 can be created by any stencil generation process; including a manual cut stencil, a photo developed stencil, a laser cut stencil, and the like. The stencil is applied to the printing screen 112 creating a blocked screen image 120. The balance of the printing screen 112 remains as an exposed screen background 122, allowing the applied moisture-blocking agent 220 to pass therethrough. A screen lower surface 116 of the printing screen 112 is positioned to contact a desired application surface of the apparel material 210 in registration with the desired image location. The applied moisture-blocking agent 220, in a liquid or paste form, is applied upon a screen upper surface 114 and wiped across the entire exposed surface of the printing screen 112. The applied moisture-blocking agent 220 passes through the exposed screen section 122, transferring the applied moisture-blocking agent 220 therethrough onto a receiving surface of the apparel material 210. The moisture-blocking agent 220 is refrained from transfer by the blocked screen image 120 applied to the printing screen 112.

The applied moisture-blocking agent 220 penetrates into the weave of the apparel material 210, preferably penetrating through the apparel material 210 forming a barrier that protects the apparel material 210 against moisture without leaving the fabric or material discolored, stiff or sticky. The applied moisture-blocking agent 220 partially or completely impregnates the apparel material 210 from the side from which the blocking agent is applied thereto, as represented in FIG. 2. The partially impregnated embodiment is presented as a partially impregnating blocking agent 221 and the completely impregnated embodiment is presented as applied moisture-blocking agent 220. Areas of the apparel material 210 exclusive of the applied moisture-blocking agent 220 remain as an exposed material section 212 and are susceptible to absorption of moisture from a wetting agent. The various embodiments able presentation of the image on a viewing material surface 214 of the apparel 200 when a wetting agent is applied to the apparel 200. The wetting agent can be applied to the viewing material surface 214 by an external source, a contacting material surface 216 by sweating, or a combination of both.

A moisture barrier layer 260 can be provided against a contacting surface 216 of the apparel material 210. The moisture barrier layer 260 is fabricated of a moisture impervious material 262, wherein the moisture impervious material 262 provides a moisture barrier between the apparel 200 and the wearer or other object having the apparel 200 placed thereon.

The contrast between a dry configuration and a wet configuration is demonstrated in the illustration of FIG. 3. The apparel 200 is shown having a dry view 242 and an adjacently shown moisture saturated view 252. The moisture activatable image 222 remains concealed to the naked eye when dry and becomes visible as a moisture-activated image 224 when subjected to applied moisture 250. The applied moisture-blocking agent 220 deters and adherence or wetting of applied moisture 250. The moisture activatable image 222 is exposed apparel material 210, wherein the apparel material 210 absorbs the applied moisture 250 and changes either shade or color, based upon the selected apparel material 210. Commonly, the wetted area creates a darker contrast to the dry portion of the apparel material 210. The process allows the apparel material 210 to retain long-lasting penetrating protection and can be used in apparel including shirts, pants, footwear, outerwear, sports gear, camping gear, hunting gear, furniture, upholstery, and the like. The base substrate material can be 100% cotton, a cotton blend, any fabric surfaces, canvas, polyester, polyester blend, leather, flannel, fleece, wood, concrete, cement, asphalt, and the like. The base substrate material can be expanded into certain versions of materials where the versions can absorb or retain moisture, including certain finishes of granite, marbles, unglazed ceramic and China, and the like. The disclosed moisture-activated invisible stencil process does not affect the integrity of any of the aforementioned materials and can withstand repeated washings. The drying process or the use of a dryer also reactivates the blocking agent.

Alternatively, the blocking agent may be applied as a liquid, gas, solid, or plasma, which then disappears to leave a pattern of both treated or blocked areas and untreated or unblocked areas. The blocking agent may be applied to the apparel material 210 by various methods, including a spray can, air brush, brush, sponge, pen applicator, paint roller, and the like.

The graphic image 222 does not appear in dry conditions 242 on the fabric or material 210 exhibiting the blocking agent properties 220, but when subjected to a liquid 250, exposes through the use of a stencil or template bearing the desired marking pattern, the blocking agent 220 prevents a change in the fabric or material 210 of the blocking agent area 220 so that the artwork 222 remains invisible under ordinary dry conditions 242, and becomes visible 224 when exposed to moisture 250.

The first example presents a positive image, where the moisture activatable image 222 is in a form of the actual image and becomes visible when subjected to applied moisture 250. A positive image can be defined where the colorless moisture-blocking agent 220 is applied representing a positive image of said artwork, wherein said blocking agent 220 is applied as a background, outlining lines of said artwork 222 and repels moisture where lines of said artwork 222 remains exposed for absorption of moisture.

Figure 4:
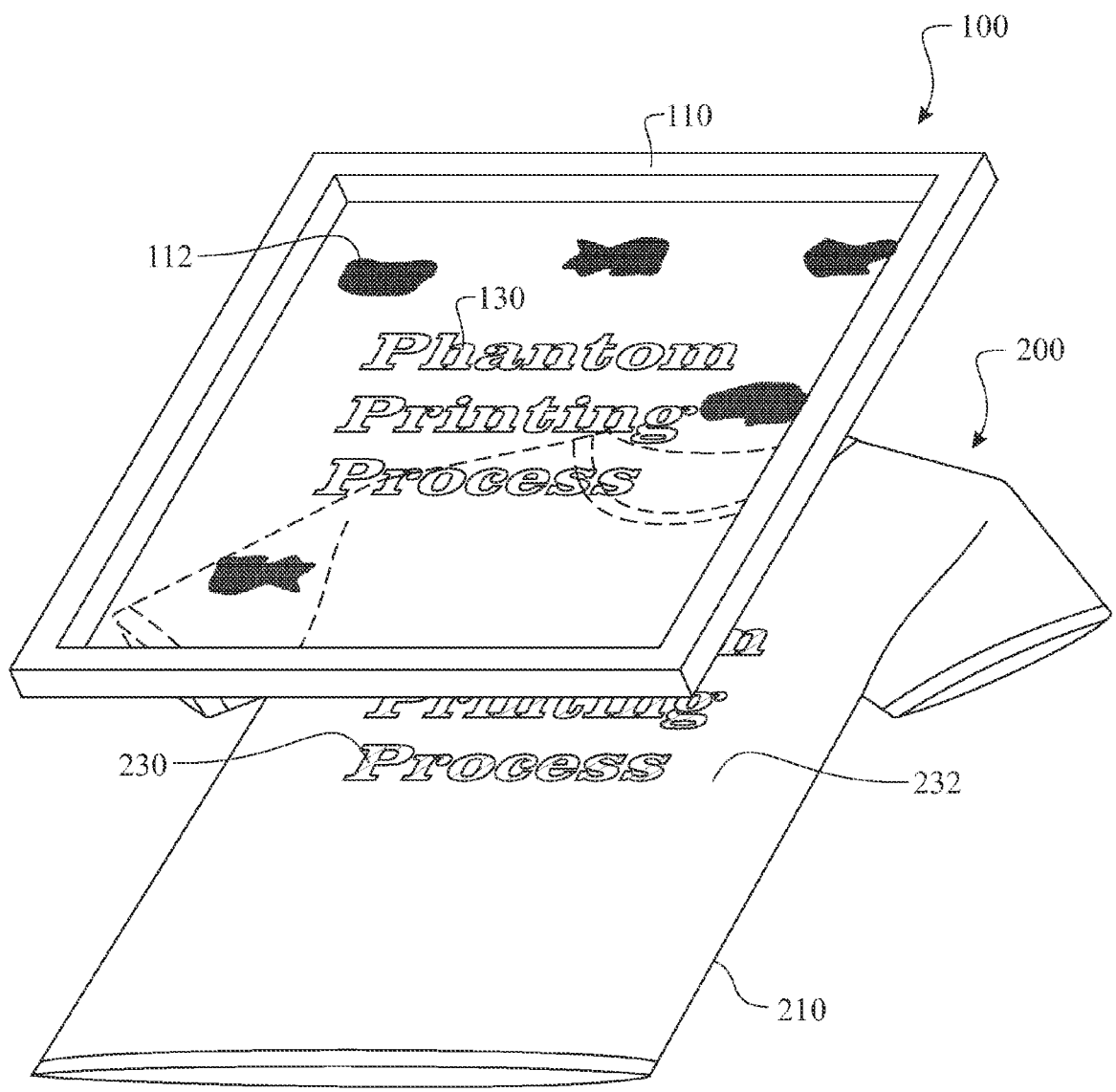
FIG. 4 presents an isometric view for applying an image blocking pattern onto an exemplary T-shirt to present a negative moisture-activated image.
Figure 5:
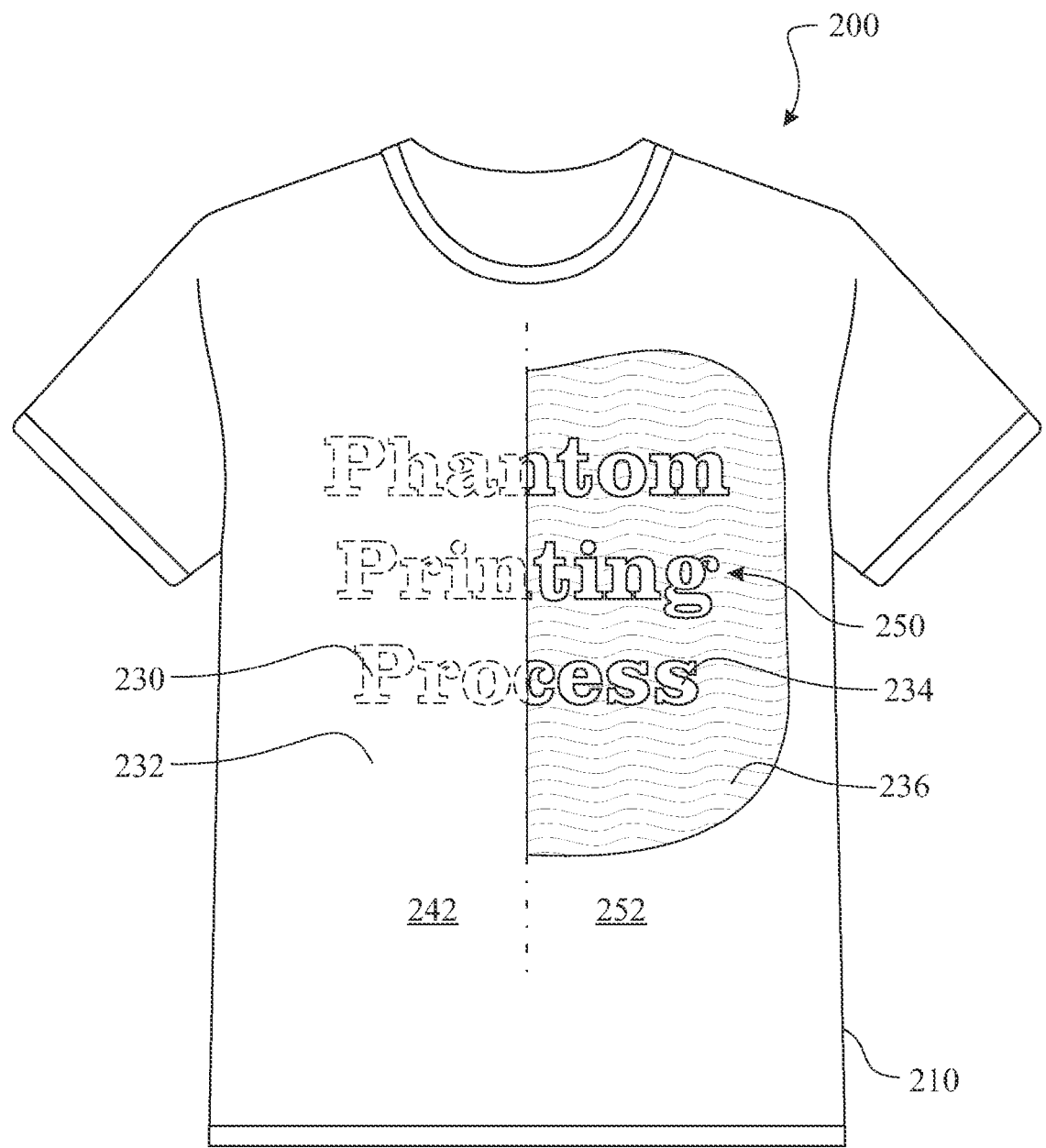
FIG. 5 presents a top plan view of the exemplary T-shirt of FIG. 4, illustrating a dry representation and a moisture applied representation of the negative artwork.

It is understood that the image may be presented in a negative form, as illustrated in FIGS. 4 and 5. The screen image is reversed, wherein the screen image includes a blocked screen background 132, leaving an exposed screen image 130 in accordance with the artwork. The applied moisture-blocking image 230 is applied to the apparel material 210, leaving a moisture activatable image background 232.

When the apparel material 210 is subjected to applied moisture 250, the moisture activatable image background 232 wets causing the moisture activatable image background 232 to transition into a moisture-activated background 236. The change to the moisture activatable image background 232 contrasts the applied moisture-blocking image 230, wherein the applied moisture-blocking image 230 becomes a visible blocked image 234. A positive image can be defined where the colorless moisture-blocking agent 220 is applied representing a negative image of said artwork 232, wherein said blocking agent is applied as lines of said artwork 230 and repels moisture wherein the background 232 remains exposed for absorption of moisture.

The first two examples are presented to describe the process using an aesthetic application. The concept can be expanded into a variety of functional applications, having several examples presented in FIGS. 6 through 14. The technology can be expanded to other products, including backpacks, bedding including mattresses, bed sheets, cover sheets, mattress liners, and the like; table wear including tablecloths, napkins, and the like; pool decks; wet roadway warnings including road surface appliqués, road signs, and the like; absorbents, including sponges, towels, and the like; coolers; individual beverage coolers; umbrellas; and the like.

Figure 6:
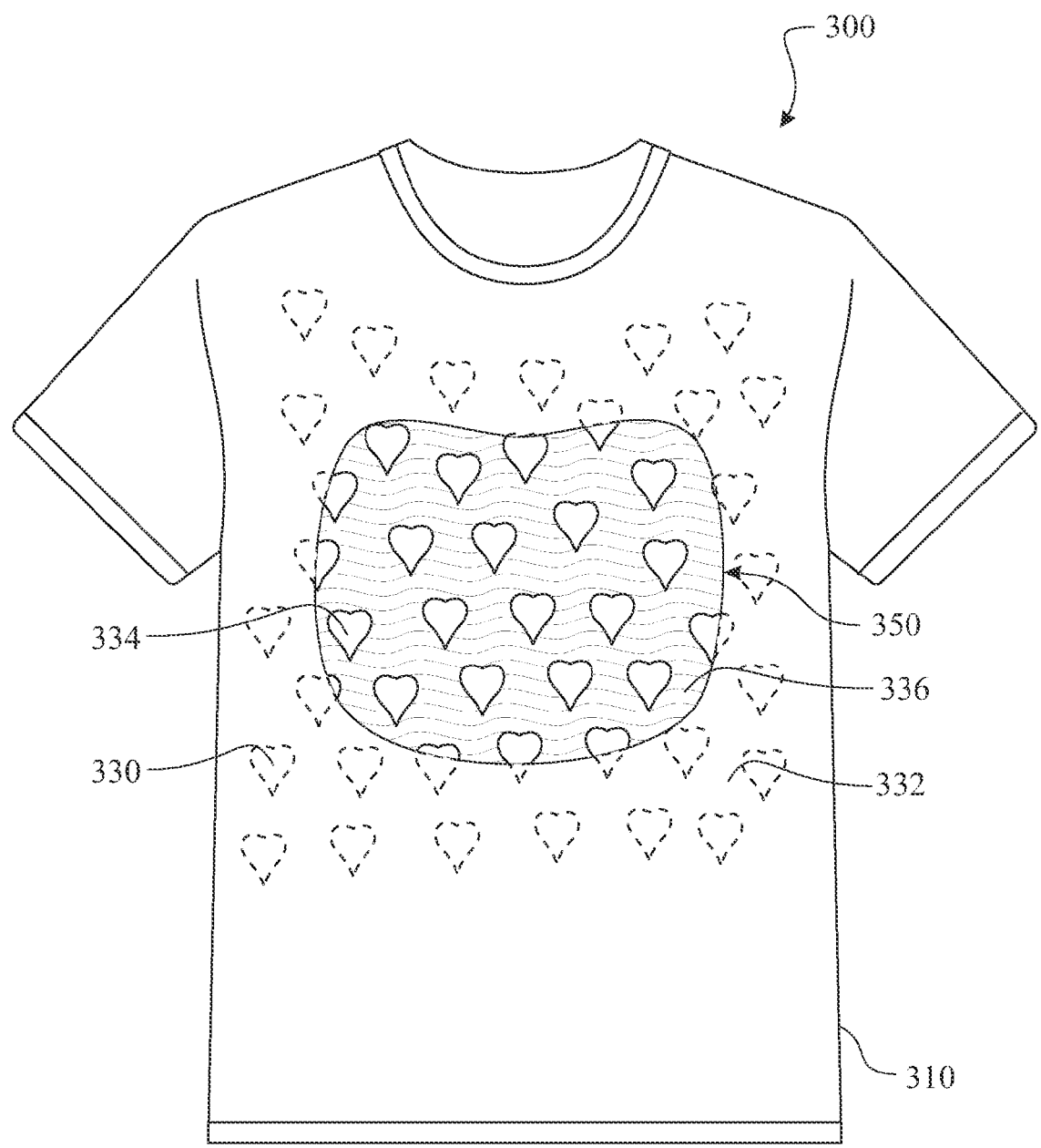
FIG. 6 presents an top plan view of the exemplary calorie burning indicator utilizing the moisture-activated image.

A first exemplary embodiment provides a calorie correlating apparel 300, presented in the illustration of FIG. 6. The calorie correlating apparel 300 includes a plurality of applied moisture-blocking image 330 disbursed about the apparel material 310. The calorie correlating apparel 300 is placed upon the individual's torso prior to exercising. As the individual exercises, the individual perspires. As the perspiration wets the moisture activatable image background 332 (exposed, unblocked portion of the apparel material 310), represented as a perspiration wetted section 350, the moisture activatable image background 332 transitions into a moisture-activated background 336, which in turn makes the respective portion of the applied moisture-blocking images 330 transition into a visible blocked image 334. The individual can then count the quantity of visible blocked images 334 and would then correlate the quantity of visible blocked images 334 to the calories burnt during the exercise routine. The exemplary embodiment presents a negative image. It is understood that the same concept can utilize a positive image. The pattern can be arranged of any number of applied moisture-blocking images 330 having any shape, and any spatial arrangement. It is desirous to have the pattern arranged to simplify the step of counting the visible blocked image 334.

Figure 7:
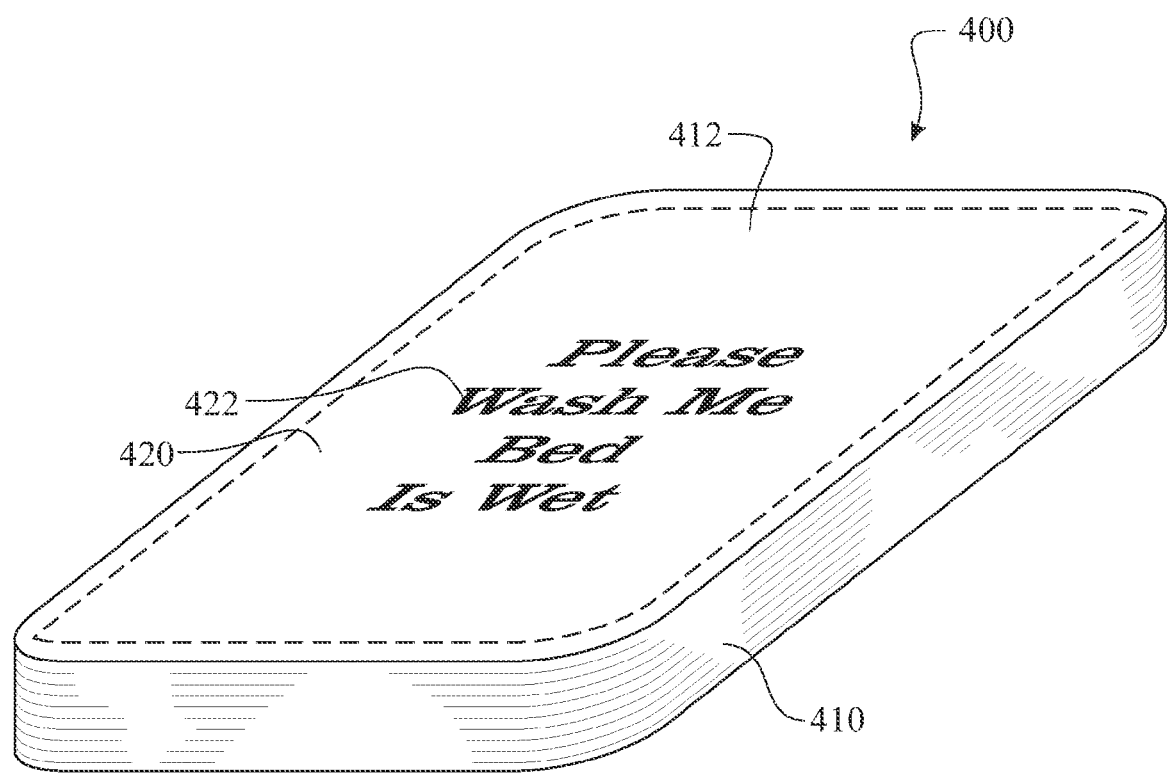
FIG. 7 presents an isometric view of a moisture-activated image utilized in an exemplary bedding application.

A second exemplary embodiment provides a moisture-indicating mattress 400, presented in the illustration of FIG. 7. The moisture-indicating mattress 400 disposes the moisture-activated invisible stencil technology upon a sleeping surface 412 of a mattress 410. The moisture-activated invisible stencil technology is represented as an applied moisture-blocking material 420 and a respective moisture activatable image 422. The moisture activatable image 422 can include artwork that would convey to an individual that the sleeping surface 412 has been wet. The moisture-activated invisible stencil technology can be applied to a mattress, a bed sheet, a sheet cover, a blanket, and the like. The artwork can be located in a common central portion of the mattress or in smaller repeated images spatially arranged about a portion or the entire surface. When the sleeping surface 412 is wet, the moisture activatable image 422 transitions from a concealed image to a visible image. The exemplary embodiment presents a negative image. It is understood that the same concept can utilize a positive image.

Figure 8:
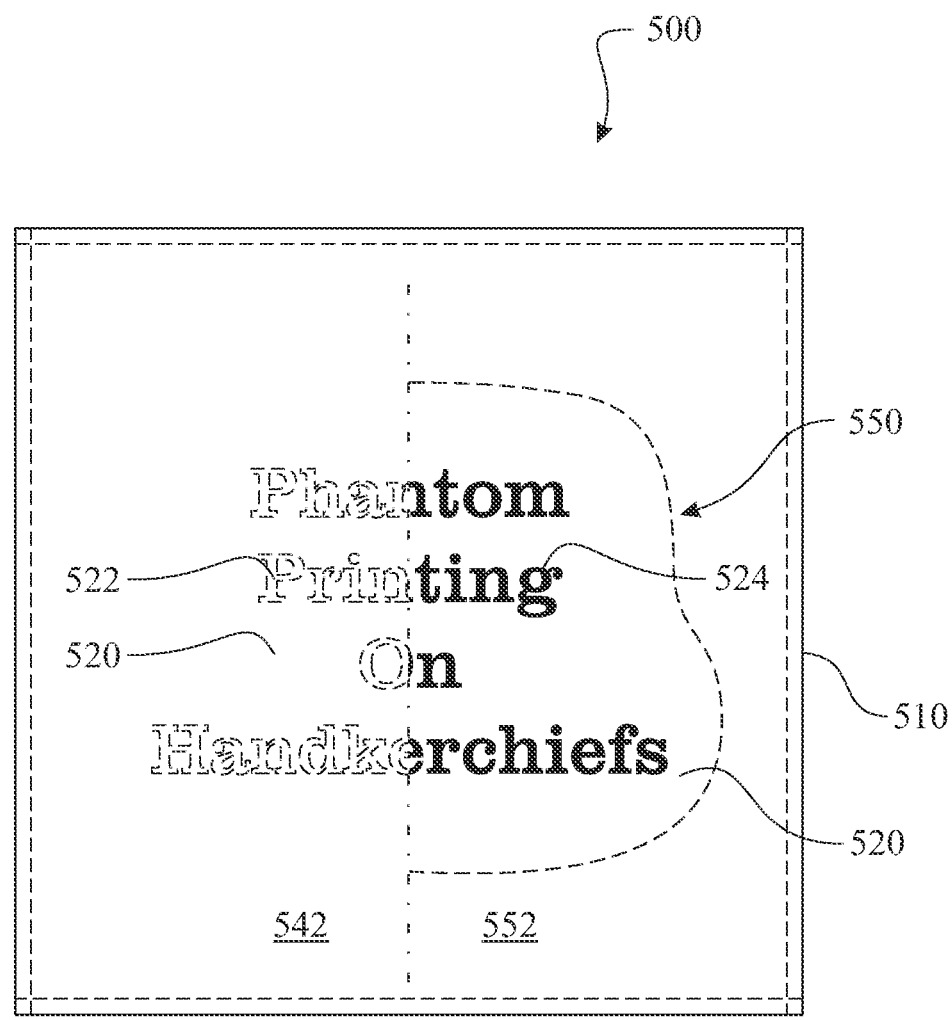
FIG. 8 presents a top plan view of a moisture-activated image utilized in an exemplary handkerchief application.

A third exemplary embodiment provides a moisture-indicating handkerchief 500, presented in the illustration of FIG. 8. The moisture-indicating handkerchief 500 disposes the moisture-activated invisible stencil technology upon a handkerchief material 510 to fabricate the moisture-indicating handkerchief 500. The moisture-activated invisible stencil technology is represented as an applied moisture-blocking material 520 and a respective moisture activatable image 522. The moisture activatable image 522 can include artwork that would convey to an individual that the handkerchief material 510 has been subjected to moisture. The artwork can be located in a common central portion of the handkerchief material 510 or in smaller repeated images spatially arranged about a portion or the entire surface thereof. The moisture activatable image 522 does not appear in a dry view 542 of the handkerchief material 510, but when subjected to an applied moisture 550, as illustrated in a moisture saturated view 552, the moisture is absorbed by the moisture activatable image 522, which transitions the moisture activatable image 522 to a moisture-activated image 524. The moisture-activated image 524 converts back to a moisture activatable image 522 when the handkerchief material 510 returns to an ordinary dry condition. The exemplary embodiment presents a negative image. It is understood that the same concept can utilize a positive image.

Figure 9:
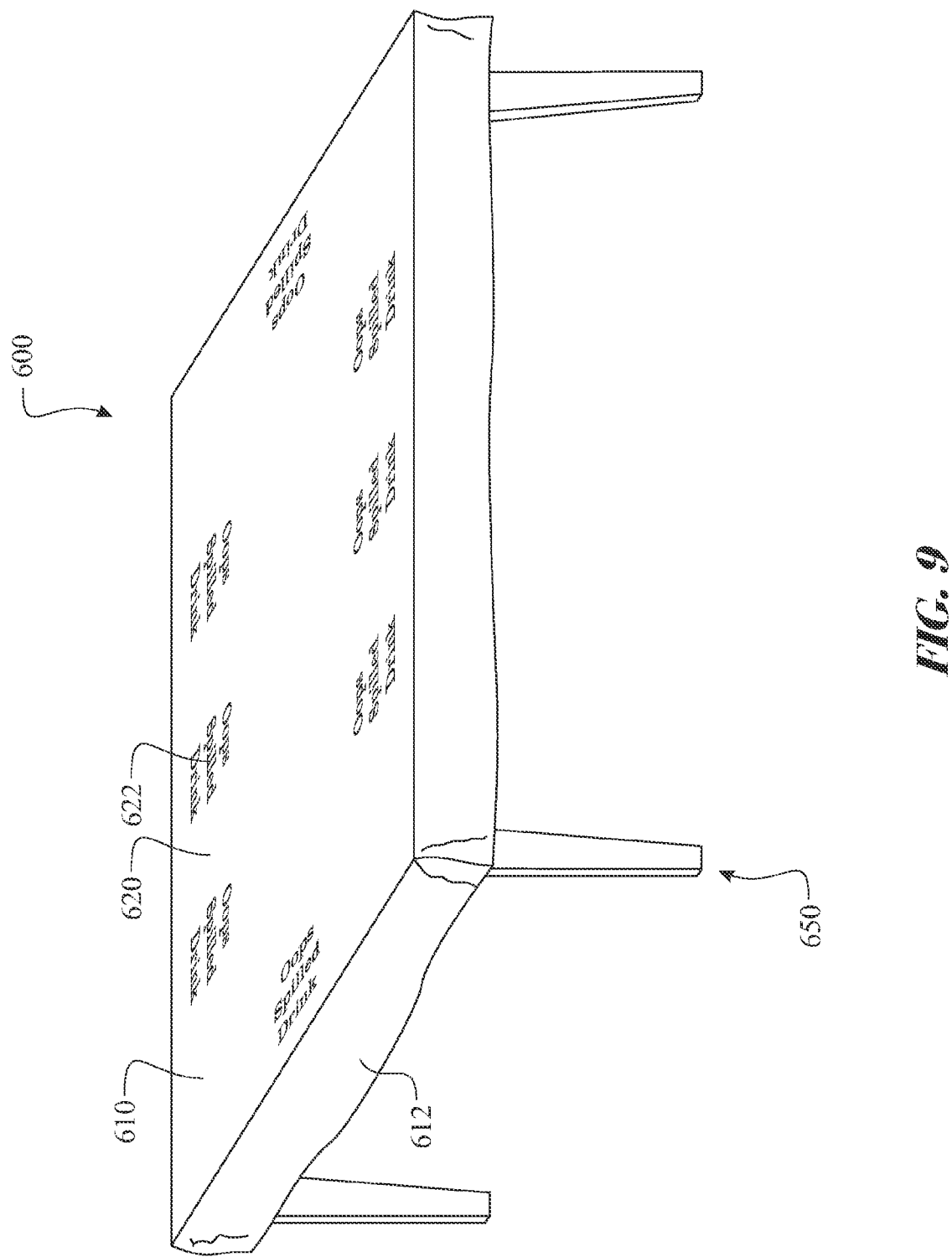
FIG. 9 presents an isometric view of a moisture-activated image utilized in an exemplary dining application.

A fourth exemplary embodiment provides a tablecloth 600, presented in the illustration of FIG. 9. The tablecloth 600 disposes the moisture-activated invisible stencil technology upon a tablecloth primary surface 610. The tablecloth primary surface 610 is placed upon an upper surface of a table 650, creating a tablecloth skirt 612 about a peripheral edge thereof. The moisture-activated invisible stencil technology is represented as a moisture activatable image 622 defined by an applied moisture-blocking material 620. The moisture activatable image 622 can include artwork that would convey to an individual that the tablecloth primary surface 610 has been wet. The moisture-activated invisible stencil technology can be applied to the tablecloth, a tablecloth cover, napkins, placemats, and the like. The artwork can be located in a common central portion of the tablecloth primary surface 610 or in smaller repeated images spatially arranged about a portion or the entire surface. When the tablecloth primary surface 610 is wet, the moisture activatable image 622 transitions from a concealed image to a visible image. The exemplary embodiment presents a positive image. It is understood that the same concept can utilize a negative image.

Figure 10:
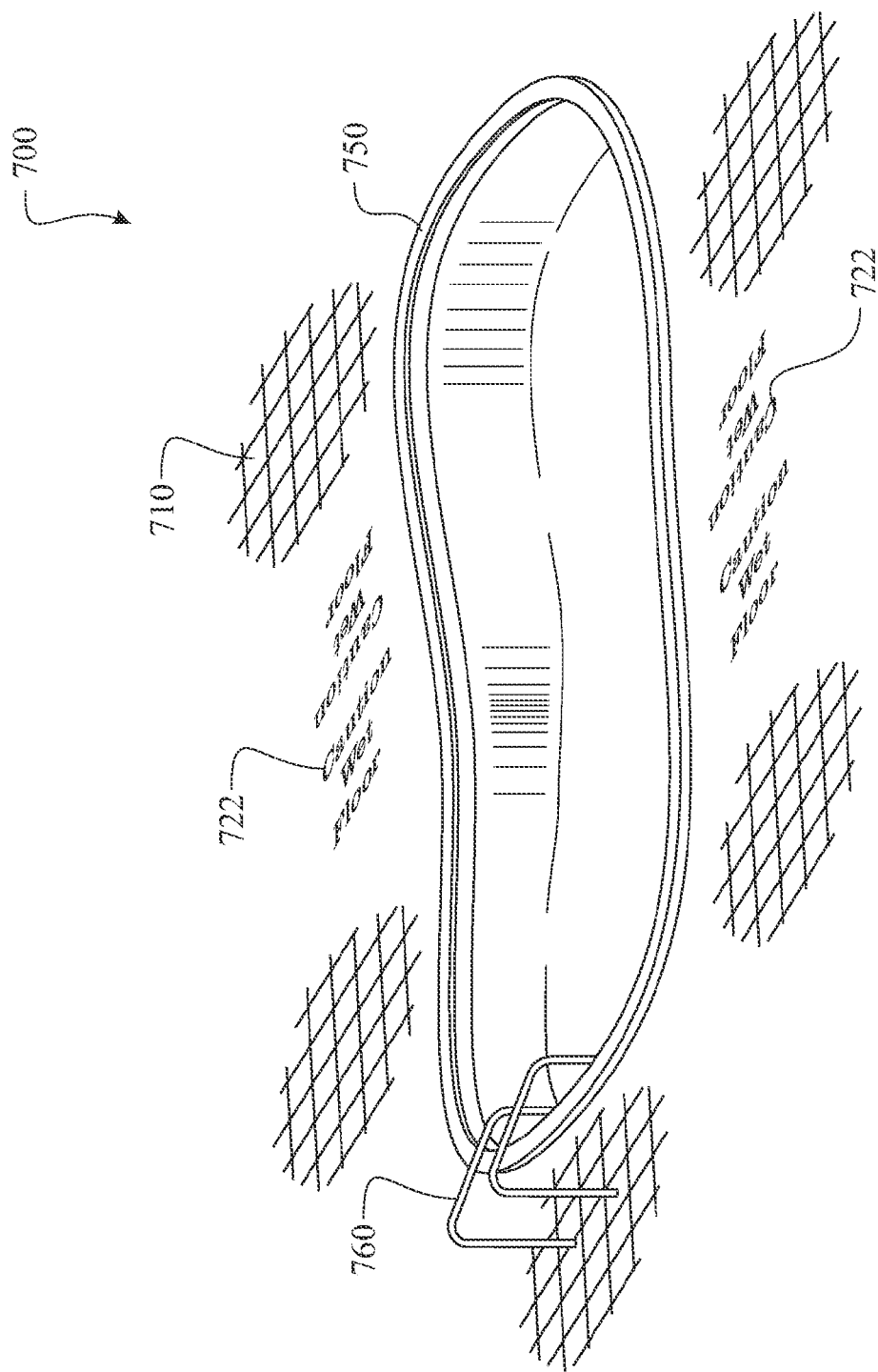
FIG. 10 presents an isometric view of a moisture-activated image utilized to indicate a slippery pool deck.

A fifth exemplary embodiment presents a pool area 700 comprising a wet surface warning system, presented in the illustration of FIG. 10. The pool area 700 includes a swimming pool 750 surrounded by a swimming pool deck 710. A pair of pool entry safety bars 760 provides aid to a swimmer during entry and exit of the swimming pool 750. A moisture activatable image 722 is applied upon a surface of the swimming pool deck 710. It is desired that a plurality of moisture activatable images 722 be spatially arranged about the swimming pool 750. It is further desired that the moisture activatable images 722 be applied in different orientations to warn individuals walking in any direction of a potentially slippery deck surface. The moisture activatable image 722 can be placed upon a water absorbent material, such as a fabric, sponge, rubber, concrete, and the like. When water splashes onto the swimming pool deck 710, the moisture activatable image 722 transitions into a visible state, thus warning individuals of the potentially slippery deck surface. The exemplary embodiment presents a positive image. It is understood that the same concept can utilize a negative image.

Figure 11:
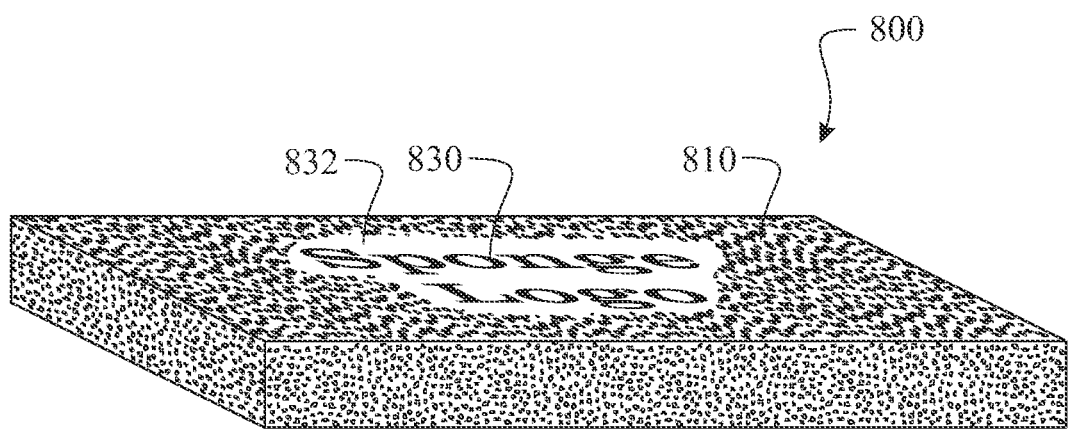
FIG. 11 presents an isometric view of a moisture-activated image utilized to indicate a moist sponge.

A sixth exemplary embodiment presents a sponge 800, comprising a method of notifying an individual that a sponge 800 or towel is wet, which is presented in the illustration of FIG. 11. An applied moisture-blocking image 830 is applied upon a sponge surface 810 of the sponge 800, leaving the balance of the sponge surface 810 as a moisture activatable image background 832. When the sponge 800 is subjected to moisture, the moisture activatable image background 832 absorbs the moisture, while the applied moisture-blocking image 830 inhibits any absorption of moisture in the respective pattern. The exemplary embodiment presents a positive image. The image can be applied to any or all sides of the sponge 800. A negative image could be used, but the surrounding image blocking background should then be limited in size to avoid impacting the overall absorption surface area of the sponge 800.

Figure 12:
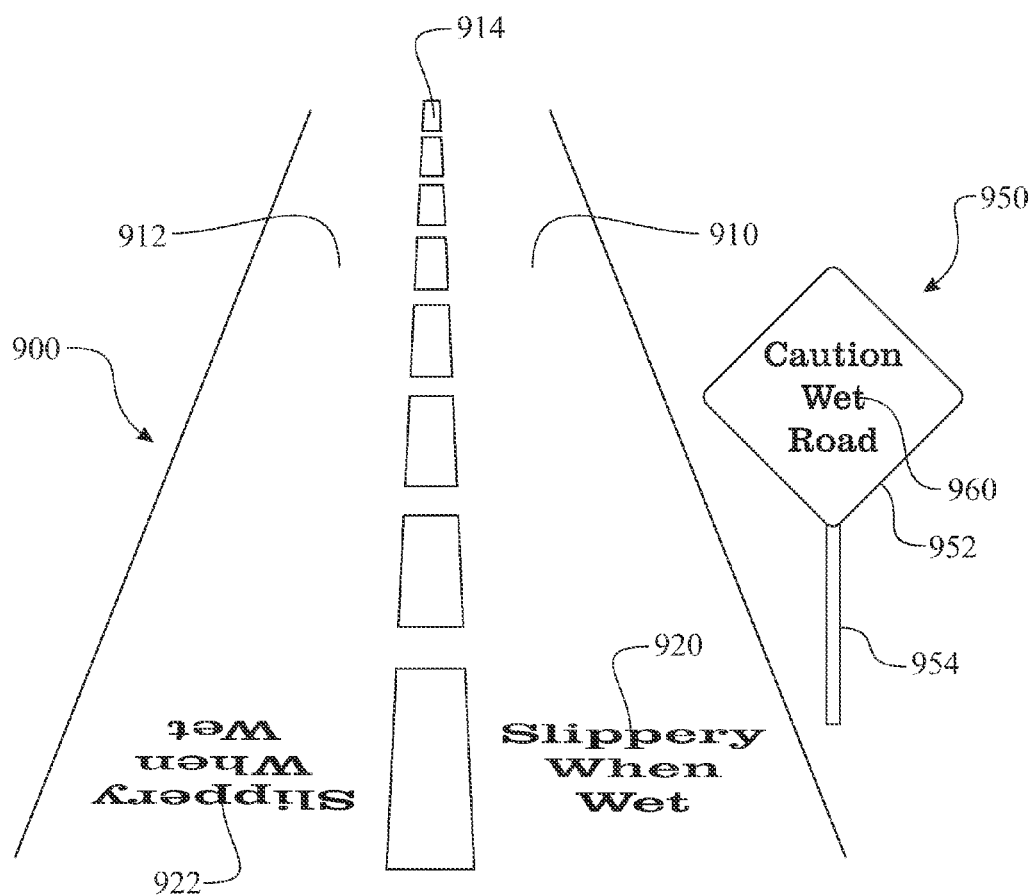
FIG. 12 presents a perspective illustration introducing several optional exemplary applications of a moisture-activated image to indicate a wet roadway surface.

A seventh exemplary embodiment presents a slippery road warning system for notifying a driver that a roadway surface 910, 912 may be slippery from moisture, which is presented in the illustration of FIG. 12. The illustration presents two exemplary embodiments, including a moisture-activated surface applied image 920, 922 and a moisture-activated sign assembly 950. The illustration presents a two-way roadway 900 comprising a first direction lane 910 and an opposing direction lane 912 divided by a lane divider marker 914. A first direction moisture-activated surface applied image 920 is applied to the first direction lane 910 and a second direction moisture-activated surface applied image 922 is applied to the opposing direction lane 912, each being oriented to be correct reading in the direction of traffic flow. The moisture-activated surface applied image 920, 922 would be applied as either a positive or negative image. The surface of the roadway 900 is preferably concrete or asphalt, enabling absorption of moisture to change color in the exposed portion, while retaining a moisture repelling section were the moisture-blocking agent is applied. It is desired that the moisture-blocking agent match the color of the surface of the roadway 900 to ensure the driver is warned of a slipper surface only when moisture collects upon the roadway surface. The moisture-activated surface applied image 920, 922 dictates that the driver watches the roadway surface. The moisture-activated sign assembly 950 presents an alternate warning device, where the moisture-activated sign assembly 950 includes a moisture-activated sign image 960 applied to a moisture-activated sign 952. The moisture-activated sign image 960 can be provided in either a positive image or a negative image configuration. The moisture-activated sign 952 is fabricated including a moisture absorbent material. The moisture absorbent material is provided on the visual surface of the moisture-activated sign 952. Examples of the moisture absorbent material include fabric, rubber, and the like. The moisture absorbent material remains exposed to the elements to collect moisture causing a change in shade or color and the blocking material, which repels any moisture to maintain a constant shade or color. Application of moisture changes the contrast between the exposed material and the blocked material causing the image to transition between a concealed state and a visible state. The exposed material and the blocked material return to a matching shade or color when the moisture-activated sign 952 dries. The moisture-activated sign 952 is posted upon an upper end of a signpost 954. The signpost 954 is inserted into the ground at a location proximate an edge of the roadway 900, positioning the moisture-activated sign 952 for viewing by a passing driver.

The slippery road warning system originally presented in the illustration of FIG. 12 may be modified by utilizing a film treatment 930, 940 as illustrated in FIGS. 13 through 16.

Figure 13:
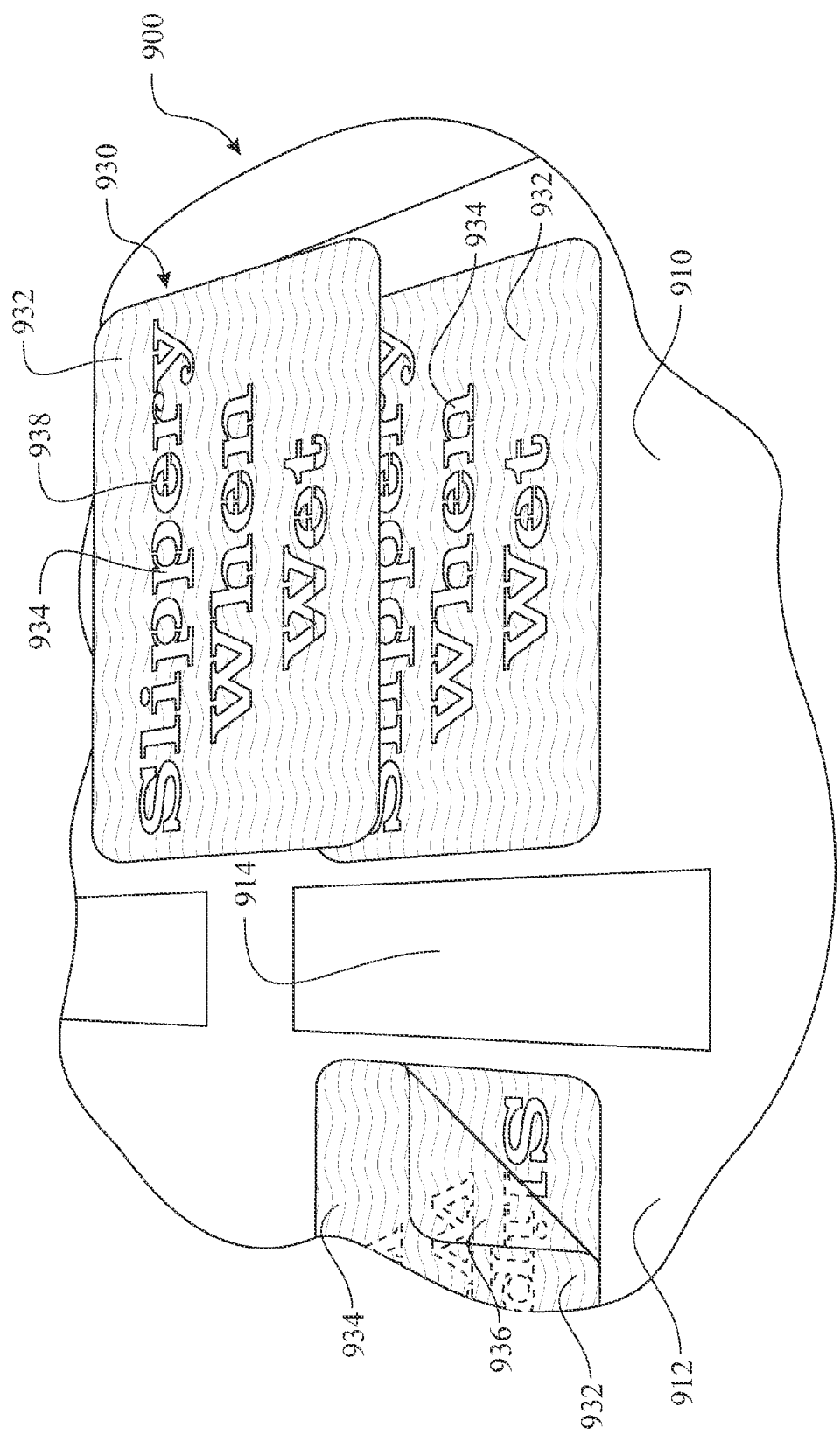
FIG. 13 presents an enlarged perspective view of an exemplary film treatment comprising a positive artwork for creating a moisture-activated image to indicate a wet roadway surface, wherein the illustration demonstrates a film application step.
Figure 14:
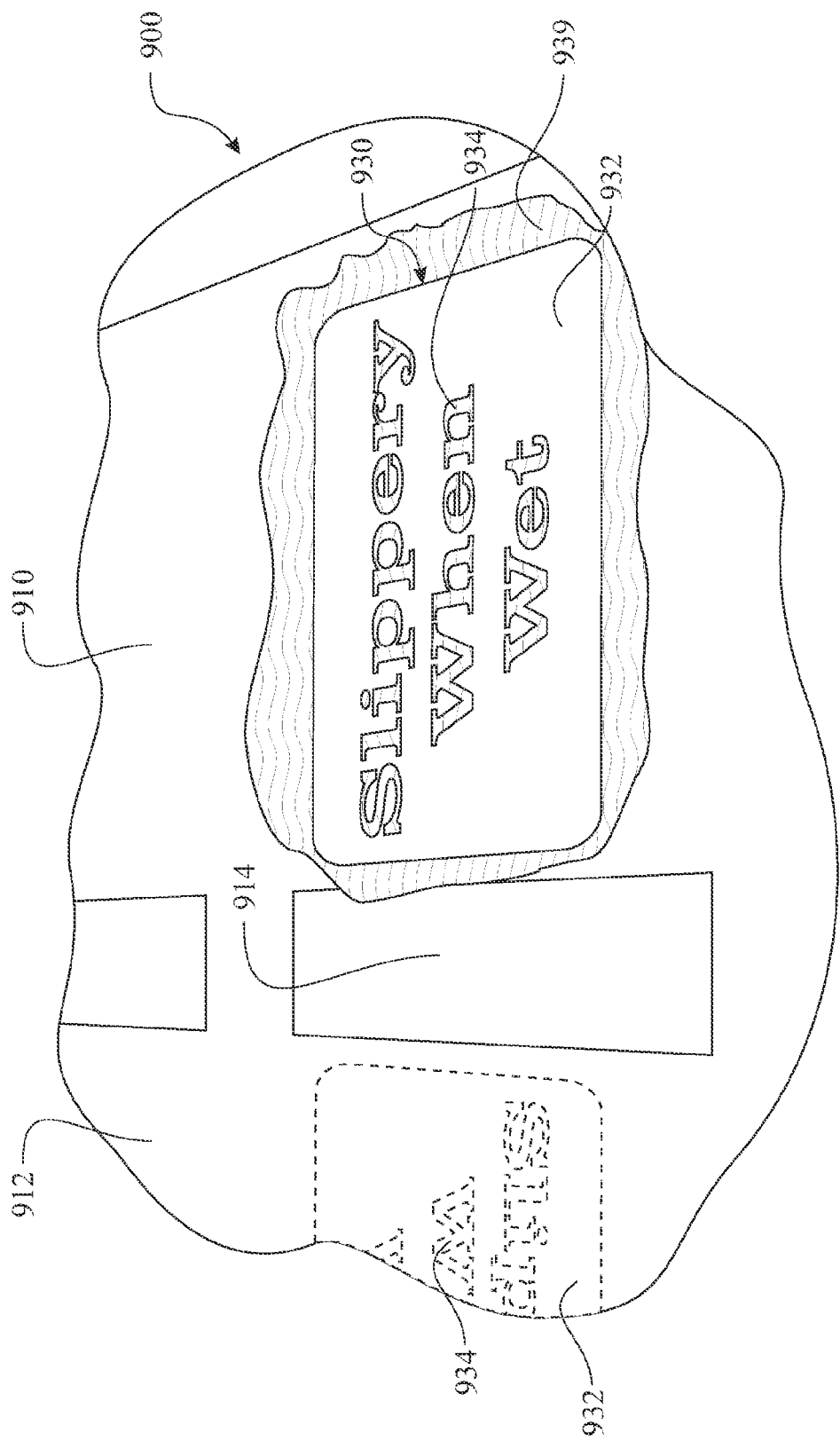
FIG. 14 presents an enlarged perspective view of the film treatment introduced in FIG. 13, illustrating a dry representation and a moisture applied representation of the positive artwork.

The positive image, moisture-activated surface applied film treatment 930 is formed by removing an image from a film substrate material 932 forming a removed, positive film image 934. It is understood that the removed, positive film image 934 may include elements that can be completely separated from the base material. This can be accommodated by any suitable known processes. A first option utilizes a stencil style cut, where the central portion of the image is attached to the base material by one or more branches 938. A second option utilizes a film treatment backing material 936, wherein the film treatment backing material 936 carries the entire film substrate material 932 until the film substrate material 932 is applied to the surface of the roadway 900. The positive image, moisture-activated surface applied film treatment 930 is applied to the first direction lane 910 in a first direction and applied to the opposing direction lane 912 is a second, opposite direction as illustrated in FIGS. 13 and 14. Moisture can be applied to the roadway 900 (as demonstrated on the first direction lane 910 of the roadway 900) as shown in FIG. 14, wherein the moisture is referred to as a moisture-activated surface 939. The illustration demonstrates how the moisture-activated surface 939 creates a contrast between the wetted region defined within the removed, positive film image 934 and the unwetting or moisture repelling material of the film substrate material 932. The contrast between the wet region with in the removed, positive film image 934 and the moisture repelled surrounding region provided by the film substrate material 932 presents a message to the driver. In a dry environment, as demonstrated on the opposing direction lane 912 of the roadway 900, the film substrate material 932 and respective removed, positive film image 934 blends into the surface of the roadway 900, thus concealing the message.

Figure 15:
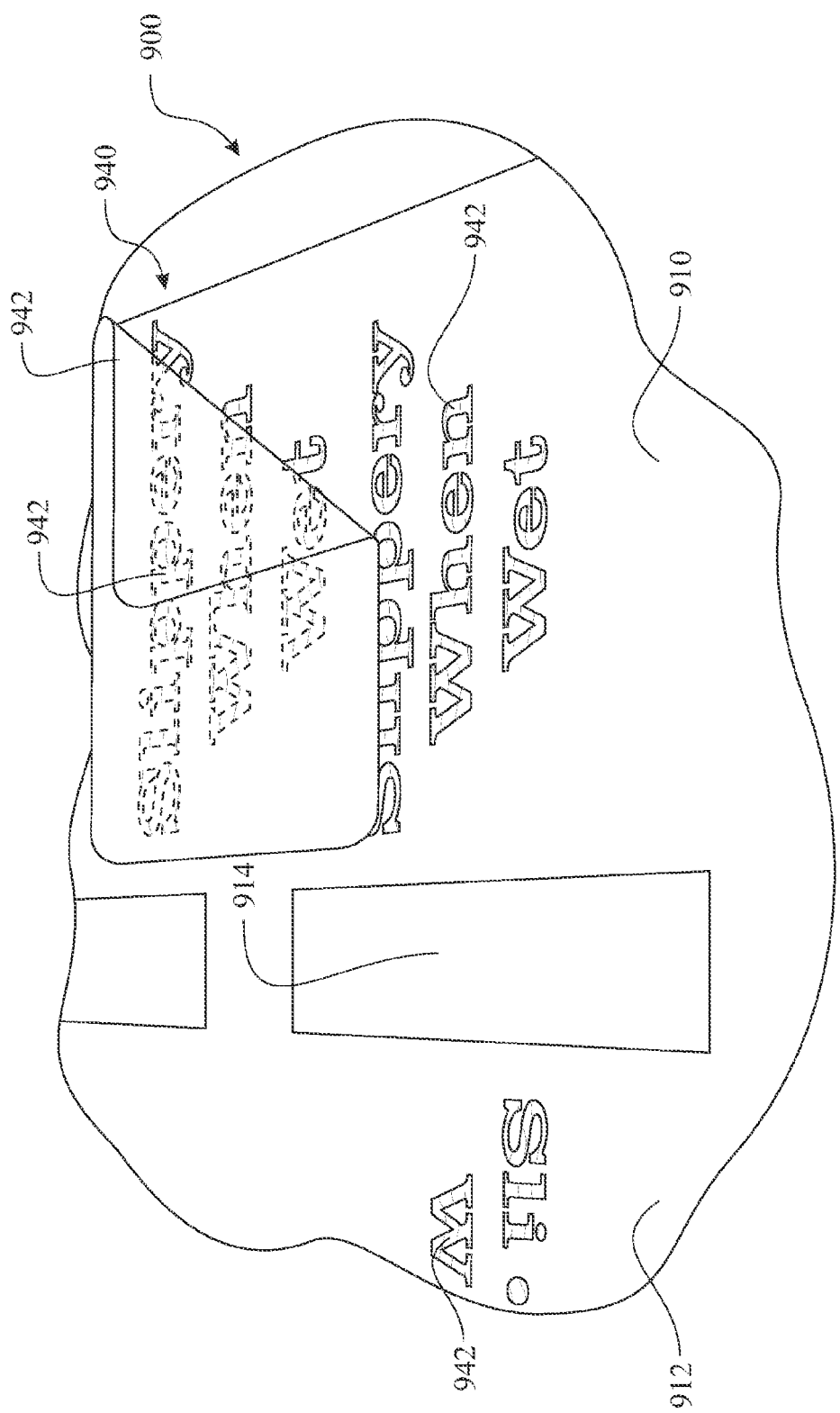
FIG. 15 presents an enlarged perspective view of a second exemplary film treatment comprising a negative artwork for creating a moisture-activated image to indicate a wet roadway surface, wherein the illustration demonstrates a film application step.
Figure 16:
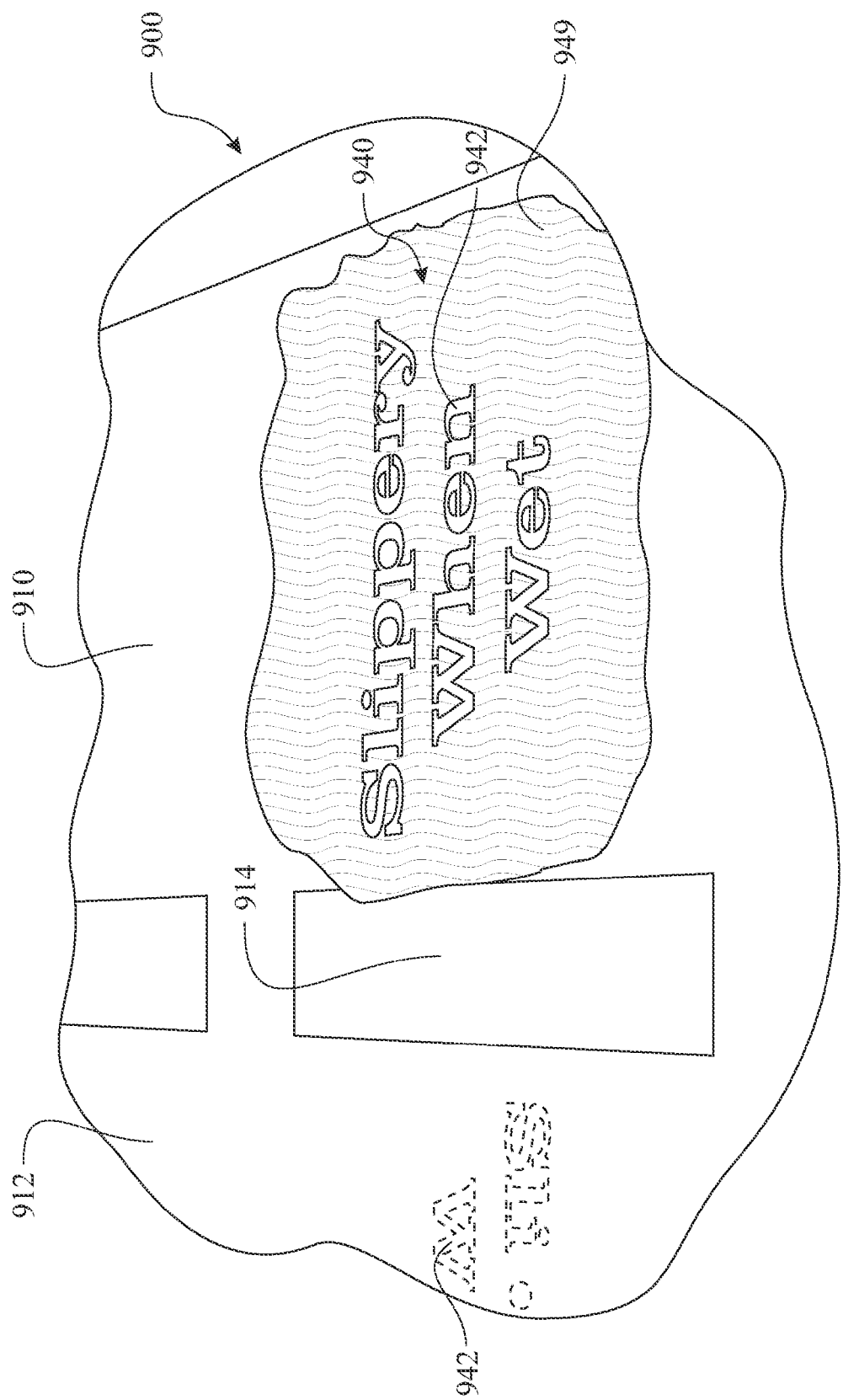
FIG. 16 presents an enlarged perspective view of the film treatment introduced in FIG. 15, illustrating a dry representation and a moisture applied representation of the negative artwork.

The negative image, moisture-activated surface applied film treatment 940 is formed by creating an image film image material 942 by removing material from base substrate. Each of the letters is generally completely separated from the others. It is desired to maintain all of the segments or letters in a single arrangement until application of the negative image, moisture-activated surface applied film treatment 940 onto the roadway 900. This can be accommodated by any suitable known processes. A first option utilizes a script or script-like font, where the letters form a continuous, attached flow. A second option utilizes a film treatment backing material 946, wherein the film treatment backing material 946 carries the entire film image material 942 until the film image material 942 is applied to the surface of the roadway 900. The negative image, moisture-activated surface applied film treatment 940 is applied to the first direction lane 910 in a first direction and applied to the opposing direction lane 912 is a second, opposite direction as illustrated in FIGS. 15 and 16. Moisture can be applied to the roadway 900 (as demonstrated on the first direction lane 910 of the roadway 900) as shown in FIG. 16, wherein the moisture is referred to as a moisture-activated surface 949. The illustration demonstrates how the moisture-activated surface 949 creates a contrast between the wetted region of the first direction lane 910 and the unwetting or moisture repelling material of the film image material 942. The contrast between the wet region of the first direction lane 910 and the moisture-repelled image created by the film image material 942 presents a message to the driver. In a dry environment, as demonstrated on the opposing direction lane 912 of the roadway 900, the film image material 942 blends into the surface of the roadway 900, thus concealing the message.

The film 930, 940 can be applied upon the roadway 900 using any of a variety of processes. In a first process, the film 930, 940 can be adhered to a surface of the roadway 900 using any suitable adhesive. The adhesive can be a one part film, a one part liquid applied to a contact side of the film 930, 940, a multi-part adhesive composition, and the like.

The film 930, 940 can be manufactured of a material that can be heated, causing the film 930, 940 to melt, thus improving the bonding thereof onto the surface of the roadway 900. The film 930, 940 can melt either onto or even penetrating into the surface of the roadway 900.

The contrast can be enhanced by any of several implementations to improve wetting and contrasting of the exposed surface of the roadway 900. One example would be an application of a moisture absorbing contrasting composition 919 upon the surface of the roadway 900, wherein the moisture absorbing contrasting composition 919 is moisture absorbent and causes a change in coloration of the coating/surface when wet. The moisture absorbing contrasting composition 919 would be applied to the entire area of the roadway 900 where the film 930, 940 is applied thereon.

Another feature of the film 930, 940 would be that the film is fabricated of an ultra-violet permissible composition, enabling the surface of the roadway 900 underneath the film 930, 940 to fade over time retaining a consistent coloring as the adjacent, exposed surface of the roadway 900.

Figure 17:
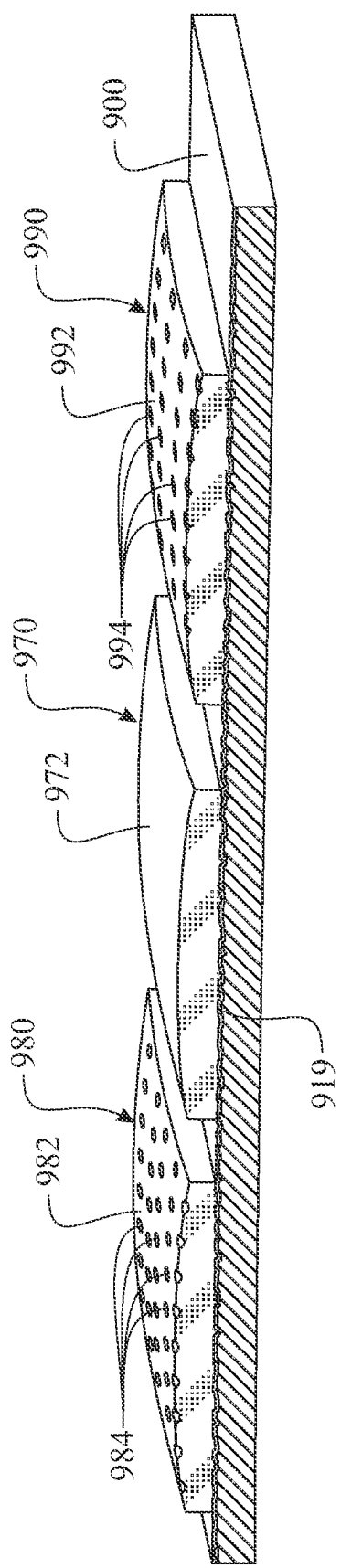
FIG. 17 presents a sectioned isometric view illustrated several enhancements to the film treatment to aid in presenting a contrast when subjected to moisture.

The film can incorporate any of a variety of contrast enhancing features. Several exemplary contrast-enhancing features are presented in FIG. 17. The film can be enhanced by forming each film segment 970, 980, 990 to include a raised central point of an arched exposed upper surface 972, 982, 992. The arched exposed upper surface 972, 982, 992 aids in flowing moisture from the respective film segment 970, 980, 990 onto the adjacent exposed surface of the roadway 900. The area between the edges of each of the film segments 970, 980, 990 retains moisture therebetween, thus increasing the time span presenting the contrasting image. The arched film exposed surface 972 can be continuous and smooth in accordance with the exemplary 970 or incorporate embossing recessions, such as a surface dimpling 984 formed within the arched film exposed surface 982 of the exemplary blocking agent film segment 980 or a surface depressions 994 formed within the arched film exposed surface 992 of the exemplary blocking agent film segment 990. The embossing recessions 984, 994 would be spatially arranged about the exposed surface of the respective film segments 980, 990. The embossing recessions 984, 994 can be formed randomly or in any suitable pattern.

The blocking agent film segment 980 can include a composition within the surface dimpling 984 that changes color when subjected to moisture. One such composition would include cobalt chloride (CoCl2). In a dry state, anhydrous cobalt chloride is blue and can be tinted to match a color of the surface of the roadway 900. When it bonds with two water molecules, (CoCl2.2H2O), it turns purple. Further hydration results in the pink hexaaquacobalt (II) chloride complex [Co(H2O)6]Cl2.

The surface depressions 994 can be formed to create a prismatic effect to aid in presenting a contrast between the moist surface of the roadway 900 and the blocking agent film segment 990. Each surface depression 994 would be shaped to create a prismatic effect using moisture collected therein.

The film 930, 940 would be manufactured of a material that maintains a similar coefficient of friction as the surface of the roadway 900. The film 930, 940 would be manufactured of a material suitable for longevity of the application, wherein the film 930, 940 would be subjected to constant abrasion from tires and other pieces of equipment riding over the film 930, 940.

The film 930, 940 would be manufactured of a material compatible for applications of new layers of asphalt or other resurfacing materials.

Figure 18:
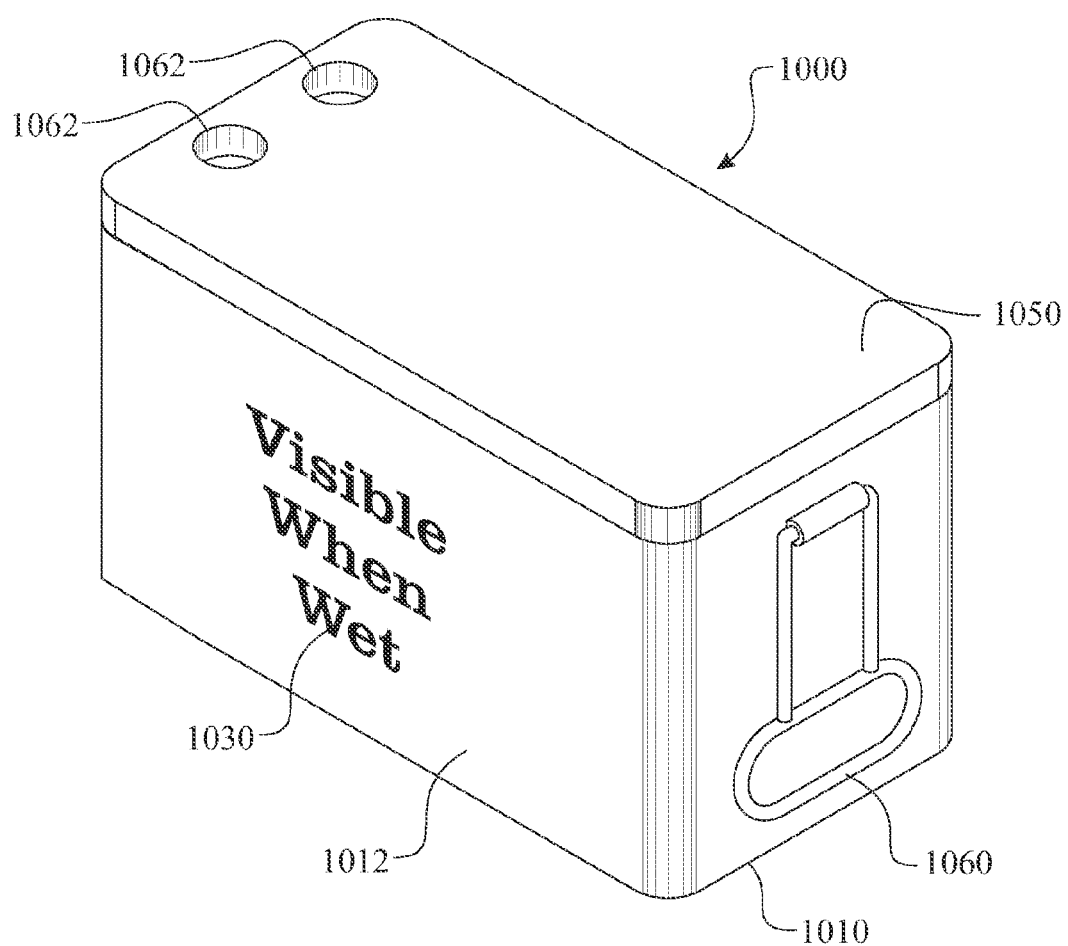
FIG. 18 presents an isometric view of a moisture-activated image utilized to indicate a moist cooler.

An eighth exemplary embodiment presents a cooler assembly 1000, comprising a method of notifying an individual that the cooler assembly 1000 is wet, which is presented in the illustration of FIG. 18. The cooler assembly 1000 is fabricated including a cooler body 1010 and a cooler lid 1050. The cooler body 1010 is preferably rectangularly shaped, having two elongated sides in a parallel arrangement, a shorter side spanning between respective matching end of the two elongated sides forming a peripheral wall, and a base spanning across a lower edge of the peripheral wall. The cooler lid 1050 is repositionally engaging with, hingeably assembled to, or slideably assembled to the cooler body 1010. One or more cup holder 1062 can be integrated into the cooler lid 1050. At least one cooler handle 1060 can be pivotally assembled to the cooler body 1010 aiding the user in portability of the cooler assembly 1000. The cooler assembly 1000 can include additional features, such as wheels, games, and other features known by those skilled in the art. A moisture-activated image 1030 is applied upon a moisture-activated surface 1012 of the cooler assembly 1000. The moisture-activated image 1030 can be either a positive image or a negative image. The cooler body 1010 can be fabricated having a moisture-activated surface 1012 or the moisture-activated surface 1012 may be applied upon the surface of the cooler body 1010. The moisture-activated image 1030 transitions between being concealed and being visible based upon either a dry or moist state.

Figure 19:
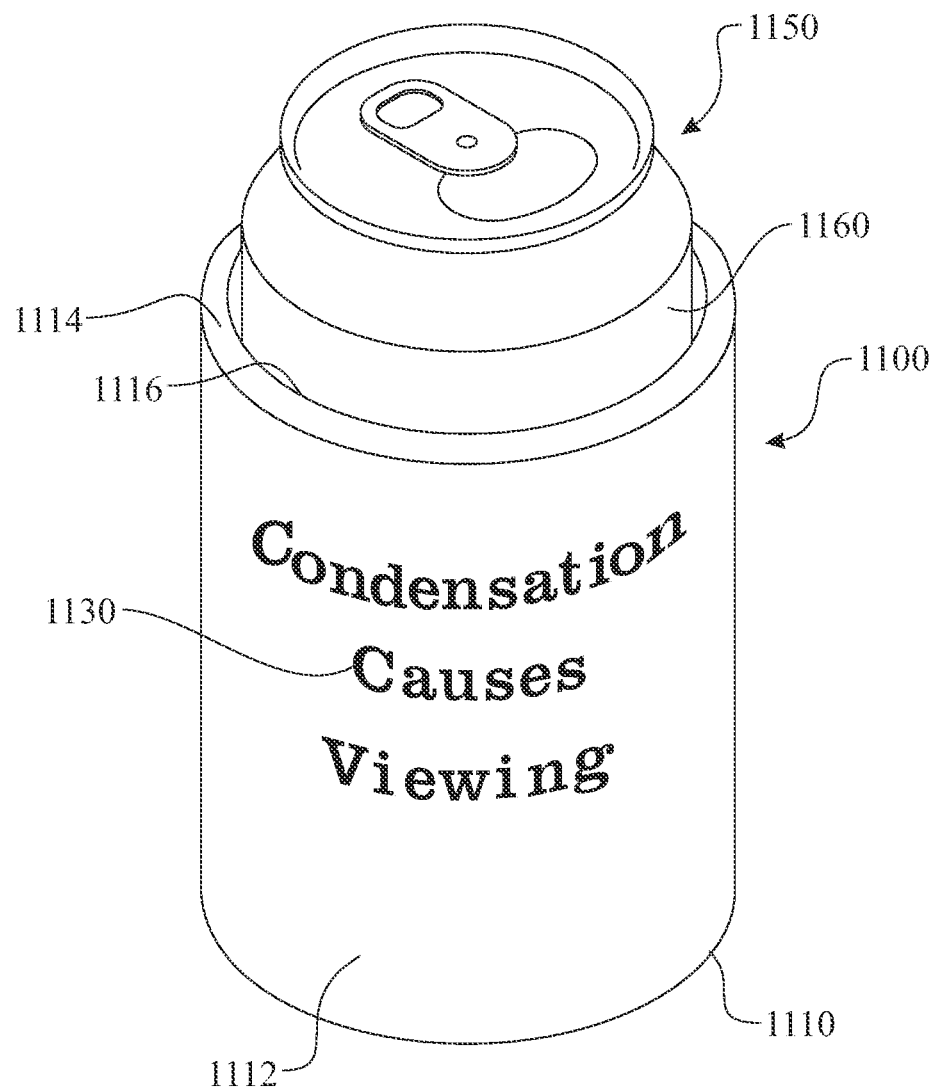
FIG. 19 presents an isometric view of a moisture-activated image utilized to indicate a moist single serving beverage cooler.

A ninth exemplary embodiment presents a drink cooler wrap 1100, comprising a method of notifying an individual that the drink cooler wrap 1100 is wet, which is presented in the illustration of FIG. 19. The drink cooler wrap 1100 is preferably fabricated of a foam material or any other moisture absorbing material. The drink cooler wrap 1100 is preferably cylindrically shaped, having tubular sidewall and a base member. The base member is assembled to the drink cooler wrap 1100 spanning across a lower edge of the tubular sidewall. An exterior surface of the tubular sidewall is defined as a drink cooler wrap exterior surface 1112. An interior surface of the tubular sidewall is defined as a drink cooler wrap interior surface 1116. An upper edge of the tubular sidewall is defined as a drink cooler wrap upper surface 1114. A beverage container 1150 comprises a beverage container sidewall 1160. The beverage container 1150 is inserted into the drink cooler wrap 1100, sliding the beverage container sidewall 1160 along the drink cooler wrap interior surface 1116 until a base of the beverage container 1150 rests against an interior surface of the base member. A moisture-activated image 1130 is applied to the drink cooler wrap exterior surface 1112. The drink cooler wrap exterior surface 1112 is preferably fabricated of a moisture absorbing material. The moisture-activated image 1130 is applied in either a positive image or a negative image. When moisture is applied to the drink cooler wrap exterior surface 1112, the image transitions from being hidden to a visible image. When the drink cooler wrap exterior surface 1112 dries, the image returns to a hidden state.

Figure 20:
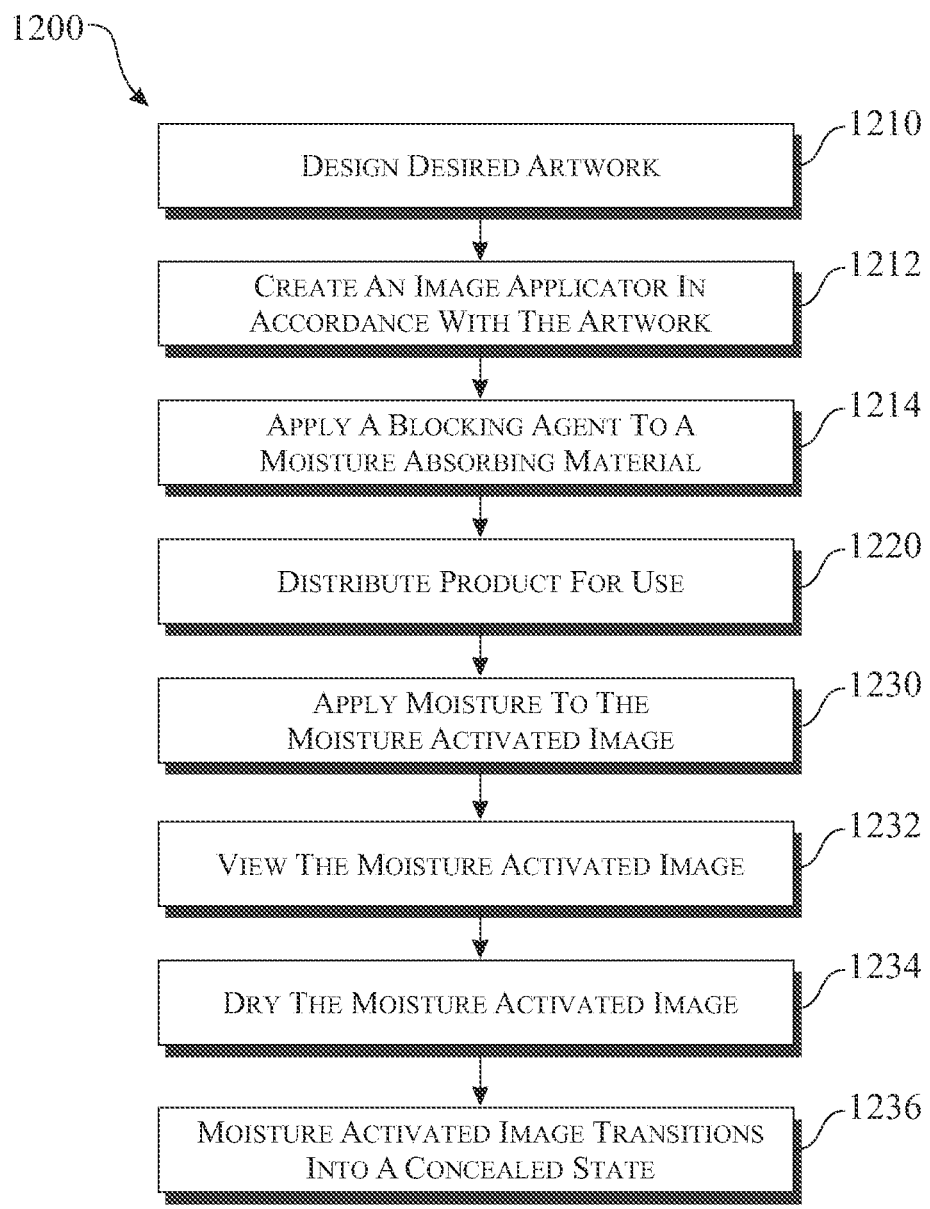
FIG. 20 presents an exemplary flow diagram representative of the present invention.

A summary of the present invention is described in a moisture-activated invisible stencil technology flow diagram 1200 presented in FIG. 20. The process initiates with a step of creating desired artwork for the application (block 1210). The artwork is then used to create an image applicator for application of the moisture-activated invisible stencil technology onto an object, wherein the stencil is representative of the artwork (block 1212). The applied moisture-blocking agent 220 is applied to the object in accordance with the selected application method (block 1214). The applied moisture-blocking agent 220 can be any type of moisture repelling or blocking chemical compound including, a four carbon fluorocarbon chain and a sulfonic acid functional group acting as an anion or ion with more electrons than protons, giving a net negative charge which functions as a stable fluorosurfactant because of the strength of carbon-fluorine bonds, a synthetic hydrophobic surface-applied compound, a fluoropolymer, and the like, and any combinations thereof. The applied moisture-blocking agent 220 can be provided in any form factor, including a liquid, cream, paste, gas, solid, aerosol, plasma, and the like. The application method can include: screen printing, spray can, air brush, brush, sponge, pen applicator, paint roller, and the like. The process provides time for the applied moisture-blocking agent 220 to dry or cure. The product is completed, packaged, and distributed for use (block 1220). Moisture is applied to the product containing the moisture-activated image (block 1230). The moisture wets the unblocked portion of the image, causing the unblocked portion of the image to change in shade or color exposing the concealed image (block 1232). It is preferred that the base substrate material be moisture absorbent. The product containing the moisture-activated image is subsequently dried (block 1234) returning the moisture-activated image into a concealed state (block 1236).

It is understood that the concept of the moisture-activated image can be used for authentication of goods, wherein the moisture-activated image would be applied to an object. The object would be subjected to moisture to activate and present the moisture-activated image. The moisture-activated image would be verification of authenticity of the object. Essentially, this application would parallel functionality of a watermark.

Alternatively, the blocking agent may be a dewetting agent applied to a wettable surface, such as glass, glazed ceramic, and the like, wherein the applied dewetting agent repels moisture and the exposed surface wets. An example of a dewetting agent is a water repellant sold under the brand name Rain-X®.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A moisture-activated image applied to a surface of a roadway comprising:
    a base carrier substrate fabricated of a moisture absorbing material, wherein said base carrier substrate is one of a surface of a roadway and a composition applied to said surface of said roadway;
    a colorless moisture-blocking agent applied onto said base carrier substrate, said moisture-blocking agent is a moisture-blocking film treatment provided in sheet form, wherein said sheet is fabricated of a hydrophobic material, said sheet comprising a pattern formed as apertures passing through said sheet, wherein said pattern resembles a desired artwork,
    wherein said moisture-blocking agent is shaped and subsequently bonded to said base carrier substrate,
    wherein when moisture is applied to said base carrier substrate, said moisture is absorbed by an exposed area of said base carrier substrate, causing a color change of said exposed area of said base carrier substrate and an area of said base carrier substrate comprising said block agent repels said moisture creating a contrast, retaining an original color of said base carrier substrate, thus displaying said pattern resembling said desired artwork.

2. A moisture-activated image as recited in claim 1, wherein said base carrier substrate is said surface of said roadway.

3. A moisture-activated image as recited in claim 1, wherein said base carrier substrate is said composition applied to said surface of said roadway.

4. A moisture-activated image as recited in claim 1, said colorless moisture-blocking agent is applied representing a positive image of said artwork, wherein said blocking agent is applied as a background, outlining lines of said artwork and repels moisture and lines of said artwork remains exposed for absorption of moisture.

5. A moisture-activated image as recited in claim 1, said colorless moisture-blocking agent is applied representing a negative image of said artwork, wherein said blocking agent is applied as lines of said artwork and repels moisture and a background remains exposed for absorption of moisture.

6. A moisture-activated image as recited in claim 1, wherein said colorless moisture-blocking agent is adhered to said surface of said base carrier substrate using an adhesive.

7. A moisture-activated image as recited in claim 1, said colorless moisture-blocking agent is fabricated of a material having a thermoforming temperature, wherein said colorless moisture-blocking agent is adhered to said surface of said roadway by elevating a temperature of said colorless moisture-blocking agent above said thermoforming temperature enabling said colorless moisture-blocking agent to adhere to said surface of said base carrier substrate.

8. A moisture-activated image as recited in claim 1, said colorless moisture-blocking agent is fabricated of a material having a thermoforming temperature, wherein said colorless moisture-blocking agent is adhered to said surface of said roadway by elevating a temperature of said colorless moisture-blocking agent above said thermoforming temperature enabling said colorless moisture-blocking agent to conform and adhere to said surface of said base carrier substrate.

9. A moisture-activated image as recited in claim 1, said colorless moisture-blocking agent further comprises an upper exposed surface, wherein said upper exposed surface comprises a raised central portion to aid in flowing moisture from each segment of said colorless moisture-blocking agent onto an adjacent exposed surface of said base carrier substrate.

10. A moisture-activated image as recited in claim 1, said colorless moisture-blocking agent further comprises a plurality of recessions spatially formed about an upper exposed surface.

11. A method of creating a moisture-activated image, the method comprising steps of:
    creating an artwork having a desired image for a desired moisture-blocking film treatment;
    creating a moisture-blocking film treatment replicating said artwork, wherein said moisture-blocking film is a colorless moisture-blocking agent applied onto said base carrier substrate, said moisture-blocking film treatment is provided in sheet form, wherein said sheet is fabricated of a hydrophobic material, said sheet comprising a pattern formed as apertures passing through said sheet, wherein said pattern resembles a desired artwork;
    adhering said moisture-blocking film treatment onto a base carrier substrate fabricated of a moisture absorbing material wherein said base carrier substrate is one of a surface of a roadway and a moisture absorbing contrasting composition applied to said surface of said roadway, wherein said moisture-blocking agent blends into said surface of said roadway becoming invisible when dry; wherein moisture is repelled in areas of said base carrier substrate where said moisture-blocking agent was applied and moisture wets said area of said base carrier substrate absent said moisture-blocking agent to transition between a concealed state and a visible state when dry and wet respectively causing a color change to said base carrier substrate creating a contrast between said exposed portion of said base carrier substrate and said moisture-blocking film treatment presenting said image.

12. A method of creating a moisture-activated image as recited in claim 11, said method further comprising a step of applying said colorless moisture-blocking agent as a background, outlining lines of said artwork, wherein said background repels moisture and lines of said artwork remains exposed for absorption of moisture.

13. A method of creating a moisture-activated image as recited in claim 11, the method further comprising a step of applying said colorless moisture-blocking agent as lines of said artwork, wherein said lines of said artwork repels moisture and a background of said artwork remains exposed for absorption of moisture.

14. A method of creating a moisture-activated image as recited in claim 11, further comprising steps of:
forming an exposed surface of said colorless moisture-blocking agent having a central raised region;
flowing moisture from each segment of said colorless moisture-blocking agent onto an adjacent exposed surface of said base carrier substrate by using said central raised region.

15. A method of creating a moisture-activated image as recited in claim 11, wherein said base carrier substrate is said surface of said roadway.

16. A method of creating a moisture-activated image as recited in claim 11, wherein said base carrier substrate is said moisture absorbing contrasting composition.

17. A method of creating a moisture-activated image as recited in claim 11, the method further comprising a step of adhering said moisture-blocking film treatment to said base carrier substrate by heating said moisture-blocking film treatment to a thermoforming temperature.

18. A method of creating a moisture-activated image as recited in claim 11, the method further comprising steps of:
adhering said moisture-blocking film treatment to said base carrier substrate by heating said moisture-blocking film treatment to a thermoforming temperature; and
conforming said moisture-blocking film treatment to a surface texture of said base carrier substrate during said heating step.

19. A method of creating a moisture-activated image as recited in claim 11, the method further comprising steps of:
supporting said moisture-blocking film treatment by temporarily adhering said moisture-blocking film treatment to a backing material; and
removing said backing material from said moisture-blocking film treatment after said moisture-blocking film treatment is applied to said base carrier substrate.

20. A method of creating a moisture-activated image as recited in claim 11, the method further comprising a step of:
informing a driver that said roadway is wet by designing said desired image to include a message conveying a warning that said roadway is wet.

\* \* \* \* \*